United States Patent
McNeff et al.

(10) Patent No.: US 8,445,709 B2
(45) Date of Patent: May 21, 2013

(54) SYSTEMS AND METHODS FOR REFINING ALKYL ESTER COMPOSITIONS

(75) Inventors: Clayton V. McNeff, Andover, MN (US); Larry C. McNeff, Anoka, MN (US); Bingwen Yan, Shoreview, MN (US); Daniel Thomas Nowlan, Hugo, MN (US)

(73) Assignee: McNeff Research Consultants, Inc., Anoka, MN (US)

( * ) Notice: Subject to any disclaimer, the term of this patent is extended or adjusted under 35 U.S.C. 154(b) by 258 days.

(21) Appl. No.: 12/797,393

(22) Filed: Jun. 9, 2010

(65) Prior Publication Data

US 2011/0060153 A1 Mar. 10, 2011

Related U.S. Application Data

(63) Continuation-in-part of application No. 11/833,839, filed on Aug. 3, 2007, now Pat. No. 7,897,798.

(60) Provisional application No. 60/821,498, filed on Aug. 4, 2006, provisional application No. 60/825,575, filed on Sep. 13, 2006, provisional application No. 60/889,730, filed on Feb. 13, 2007, provisional application No. 61/185,453, filed on Jun. 9, 2009.

(51) Int. Cl.
    *C07C 51/00* (2006.01)

(52) U.S. Cl.
    USPC .......................................... 554/169; 554/167

(58) Field of Classification Search
    USPC .............................................. 554/167, 169
    See application file for complete search history.

(56) References Cited

U.S. PATENT DOCUMENTS

| 2,383,632 A | 8/1945 | Trent, W. R. |
| 2,679,471 A | 5/1954 | Ayers et al. |
| 3,383,396 A | 5/1968 | Cahn et al. |

(Continued)

FOREIGN PATENT DOCUMENTS

| BR | 8202429 | 11/1983 |
| CN | 1680514 | 10/2005 |

(Continued)

OTHER PUBLICATIONS

"Mexico Office Action", from MX Application No. MX/a/2009/008612, mailed Jul. 11, 2012, (pp. 1-3), Including English translation.

(Continued)

*Primary Examiner* — Deborah D Carr
(74) *Attorney, Agent, or Firm* — Pauly, DeVries Smith & Deffner, L.L.C.

(57) ABSTRACT

The present invention relates to systems and methods for producing and/or refining alkyl ester compositions. In an embodiment the invention includes a method of producing a refined fatty acid alkyl ester composition. The method can include contacting a fatty acid feedstock and an alcohol with a first metal oxide catalyst at a temperature of greater than 200 degrees Celsius and a pressure of greater than 500 psi to form an unrefined fatty acid alkyl ester composition. The method can further include combining the unrefined fatty acid alkyl ester composition with dimethyl carbonate to form a refining mixture. The method can also include contacting the refining mixture with a second metal oxide catalyst at a temperature of greater than 100 degrees Celsius to form a refined fatty acid alkyl ester composition. Other embodiments are also described herein.

20 Claims, 18 Drawing Sheets

U.S. PATENT DOCUMENTS

| | | |
|---|---|---|
| 4,138,336 A | 2/1979 | Mendel et al. |
| 4,216,337 A | 8/1980 | Baba et al. |
| 4,487,933 A | 12/1984 | Mixan |
| 4,582,589 A | 4/1986 | Ushizawa et al. |
| 4,716,218 A | 12/1987 | Chen et al. |
| 4,861,739 A | 8/1989 | Pellet et al. |
| 5,108,597 A | 4/1992 | Funkenbusch et al. |
| 5,179,219 A | 1/1993 | Priegnitz |
| 5,182,016 A | 1/1993 | Funkenbusch et al. |
| 5,252,762 A | 10/1993 | Denton |
| 5,254,262 A | 10/1993 | Funkenbusch et al. |
| 5,271,833 A | 12/1993 | Funkenbusch et al. |
| 5,298,650 A | 3/1994 | Walter et al. |
| 5,321,197 A | 6/1994 | Angstadt et al. |
| 5,346,619 A | 9/1994 | Funkenbusch et al. |
| 5,350,879 A | 9/1994 | Engel et al. |
| 5,508,457 A | 4/1996 | Bayense et al. |
| 5,532,392 A | 7/1996 | Gheorghiu |
| 5,540,834 A | 7/1996 | Carr et al. |
| 5,908,946 A | 6/1999 | Stern et al. |
| 6,090,959 A | 7/2000 | Hirano et al. |
| 6,211,390 B1 | 4/2001 | Peter et al. |
| 6,376,701 B1 | 4/2002 | Chavan et al. |
| 6,392,062 B1 | 5/2002 | Haas |
| 6,433,146 B1 | 8/2002 | Cheryan |
| 6,489,496 B2 | 12/2002 | Barnhorst et al. |
| 6,538,146 B2 | 3/2003 | Turck |
| 6,666,074 B2 | 12/2003 | Gerner et al. |
| 6,712,867 B1 | 3/2004 | Boocock |
| 6,719,815 B2 | 4/2004 | Nanninga et al. |
| 6,768,015 B1 | 7/2004 | Luxem et al. |
| 6,878,837 B2 | 4/2005 | Bournay et al. |
| 6,887,283 B1 | 5/2005 | Ginosar et al. |
| 6,960,672 B2 | 11/2005 | Nakayama et al. |
| 6,963,004 B2 | 11/2005 | Ahtchi-Ali et al. |
| 6,965,044 B1 | 11/2005 | Hammond et al. |
| 6,979,426 B2 | 12/2005 | Teall et al. |
| 6,982,340 B2 | 1/2006 | Mumura et al. |
| 7,045,100 B2 | 5/2006 | Ergun et al. |
| 7,097,770 B2 | 8/2006 | Lysenko |
| 7,112,688 B1 | 9/2006 | Tysinger et al. |
| 7,145,026 B2 | 12/2006 | Fleisher |
| 7,151,187 B2 | 12/2006 | Delfort et al. |
| 7,211,681 B2 | 5/2007 | Furuta |
| 7,321,052 B2 | 1/2008 | Miller et al. |
| 7,498,454 B2 | 3/2009 | Redlingshoefer et al. |
| 7,563,915 B2 | 7/2009 | Matson |
| 7,582,784 B2 | 9/2009 | Banavali et al. |
| 7,601,858 B2 | 10/2009 | Cantrell et al. |
| 7,790,651 B2 | 9/2010 | Lin |
| 7,897,798 B2 | 3/2011 | Mcneff |
| 8,017,796 B2 | 9/2011 | Mcneff et al. |
| 2002/0010359 A1 | 1/2002 | Kaita et al. |
| 2002/0156305 A1 | 10/2002 | Turck |
| 2003/0229238 A1 | 12/2003 | Fleisher |
| 2004/0074760 A1 | 4/2004 | Portnoff et al. |
| 2004/0087809 A1 | 5/2004 | Nakayama et al. |
| 2004/0094477 A1 | 5/2004 | Lysenko et al. |
| 2005/0006290 A1 | 1/2005 | Patten |
| 2005/0064577 A1 | 3/2005 | Berzin |
| 2005/0080280 A1 | 4/2005 | Yoo |
| 2005/0118409 A1 | 6/2005 | McNeff et al. |
| 2005/0137411 A1 | 6/2005 | Ahtchi-Ali et al. |
| 2005/0204612 A1 | 9/2005 | Connemann et al. |
| 2005/0239182 A1 | 10/2005 | Berzin |
| 2005/0260553 A1 | 11/2005 | Berzin |
| 2005/0261509 A1 | 11/2005 | Delfort et al. |
| 2005/0266139 A1 | 12/2005 | Lacome et al. |
| 2005/0274065 A1 | 12/2005 | Portnoff et al. |
| 2006/0014974 A1 | 1/2006 | Bournay et al. |
| 2006/0041152 A1 | 2/2006 | Cantrell et al. |
| 2006/0041153 A1 | 2/2006 | Cantrell et al. |
| 2006/0080891 A1 | 4/2006 | Ghosh et al. |
| 2006/0149087 A1 | 7/2006 | Furuta |
| 2006/0224005 A1 | 10/2006 | Felly |
| 2006/0252950 A1 | 11/2006 | Ginosar et al. |
| 2006/0260186 A1 | 11/2006 | Iversen et al. |
| 2006/0288636 A1 | 12/2006 | Iijima et al. |
| 2007/0010682 A1 | 1/2007 | Myllyoja et al. |
| 2007/0027338 A1 | 2/2007 | Furuta |
| 2007/0037994 A1 | 2/2007 | Canos et al. |
| 2007/0066838 A1 | 3/2007 | Hillion et al. |
| 2007/0089356 A1 | 4/2007 | Krasutsky et al. |
| 2007/0093380 A1 | 4/2007 | Srinivas et al. |
| 2007/0196892 A1 | 8/2007 | Winsness et al. |
| 2007/0283619 A1 | 12/2007 | Hillion et al. |
| 2008/0161615 A1 | 7/2008 | Chapus et al. |
| 2008/0188676 A1 | 8/2008 | Anderson et al. |
| 2008/0197052 A1 | 8/2008 | McNeff et al. |
| 2008/0318763 A1 | 12/2008 | Anderson |
| 2009/0029445 A1 | 1/2009 | Eckelberry et al. |
| 2010/0087670 A1 | 4/2010 | Wang et al. |
| 2010/0147771 A1 | 6/2010 | McNeff et al. |
| 2010/0170143 A1 | 7/2010 | McNeff et al. |
| 2010/0170147 A1 | 7/2010 | McNeff et al. |
| 2010/0191004 A1 | 7/2010 | McNeff et al. |

FOREIGN PATENT DOCUMENTS

| | | |
|---|---|---|
| CN | 1718679 | 1/2006 |
| CN | 1858160 | 11/2006 |
| CN | 1887417 | 1/2007 |
| CN | 1928016 | 3/2007 |
| DE | 102005038137 | 2/2007 |
| EP | 0198243 | 10/1986 |
| EP | 0507217 | 10/1992 |
| EP | 0535290 | 4/1993 |
| EP | 1505048 | 2/2005 |
| EP | 1580255 | 9/2005 |
| EP | 1607467 | 12/2005 |
| EP | 1681281 | 7/2006 |
| FR | 2188612 | 1/1974 |
| FR | 2188612 A5 | 1/1974 |
| FR | 2679471 | 1/1993 |
| FR | 2890656 | 3/2007 |
| GB | 2132222 | 7/1984 |
| JP | 6313188 | 11/1994 |
| JP | 11228494 | 8/1999 |
| JP | 2005126346 | 5/2005 |
| JP | 2005177722 | 7/2005 |
| JP | 2007153943 | 6/2007 |
| JP | 2007190450 | 8/2007 |
| JP | 2008111085 | 5/2008 |
| WO | WO-0005327 | 2/2000 |
| WO | WO-03/062358 | 7/2003 |
| WO | WO-03/087279 | 10/2003 |
| WO | WO-03094598 | 11/2003 |
| WO | WO-2004/085585 | 10/2004 |
| WO | WO-2004096962 | 11/2004 |
| WO | WO-2005/000782 | 1/2005 |
| WO | WO-2005021697 | 3/2005 |
| WO | WO-2005/035479 | 4/2005 |
| WO | WO-2005/093015 | 10/2005 |
| WO | WO-2005/123890 | 12/2005 |
| WO | WO-2006/081644 | 8/2006 |
| WO | WO-2006/088254 | 8/2006 |
| WO | WO-2006/093896 | 9/2006 |
| WO | WO-2006/094986 | 9/2006 |
| WO | WO-2007/011343 | 1/2007 |
| WO | WO-2007/012190 | 2/2007 |
| WO | WO-2007/025360 | 3/2007 |
| WO | WO-2007/029851 | 3/2007 |
| WO | WO-2007/038605 | 4/2007 |
| WO | WO-2007/043062 | 4/2007 |
| WO | WO-2007072972 | 6/2007 |
| WO | WO-2006/070661 | 7/2007 |
| WO | WO-2007077950 | 7/2007 |
| WO | WO-2007111604 | 10/2007 |
| WO | WO-2007140395 | 12/2007 |
| WO | WO-2007141293 | 12/2007 |
| WO | WO-2007142983 | 12/2007 |
| WO | WO-2008012275 | 1/2008 |
| WO | WO-2008019325 | 2/2008 |
| WO | WO 2008019325 A2 * | 2/2008 |
| WO | WO-2008/034109 | 3/2008 |
| WO | WO-2008029132 | 3/2008 |
| WO | WO-2008041038 | 4/2008 |
| WO | WO-2008101032 | 8/2008 |

| | | | |
|---|---|---|---|
| WO | WO-2009002880 A1 | 12/2008 | |
| WO | WO-2009007234 | 1/2009 | |
| WO | WO 2009007234 A1 * | 1/2009 | |
| WO | WO-2009007234 A1 | 1/2009 | |
| WO | WO-2010144597 | 12/2010 | |

OTHER PUBLICATIONS

"Response to Mexico Office Action", from MX Application No. MX/a/2009/008612, mailed Oct. 30, 2012, (8 pages).
File History in co-pending U.S. Appl. No. 12/030,801, Entitled "Devices and Methods for Selective Removal of Contaminants from a Composition" (pp. 1-237), 2010.
International Search Report and Written Opinion from International Application No. PCT/US2008/053883, mailed Jul. 9, 2008 (pp. 1-13).
PCT International Search Report and Written Opinion from International Application No. PCT/US2007/075211, mailed Jul. 9, 2008 (pp. 1-14).
"EP Communication, EPO form 2906 01.91TRI, from the European Patent Office in EP Patent Application No. 07840692.3, corresponding to U.S. Appl. No. 11/833,839, mailed Dec. 11, 2009, (pp. 1-4)".
"EP Communication, EPO form 2906 01.91TRI, from the European Patent Office in EP Patent Application No. 08729792.5, corresponding to U.S. Appl. No. 12/030,801, mailed Mar. 2, 2010, (pp. 1-4)".
"File History for co-pending U.S. Appl. No. 12/238,750, "Methods and Compositions for Refining Lipid Feed Stocks," (168 pages)", 2010.
"File History for co-pending U.S. Appl. No. 12/540,568, "Systems for Selective Removal of Contaminants From a Composition and Methods of Regenerating the Same," (117 pages)", 2010.
"Kyte Centrifuge Sales & Consulting", www.kcentrifuge.com, p. 1.
"PCT International Search Report and Written Opinion from International Application No. PCT/US2010/038000, corresponding to U.S. Appl. No. 12/797,393, mailed Oct. 4, 2010, pp. 1-13".
"PCT Notification Concerning Transmittal of International Preliminary Report on Patentability", From International Application No. PCT/US2007075211, corresponding to U.S. Appl. No. 11/833,839, mailed Feb. 19, 2009, pp. 1-9.
"PCT Notification Concerning Transmittal of International Preliminary Report on Patentability", From International Application No. PCT/US2008053883, corresponding to U.S. Appl. No. 12/030,801, mailed Aug. 27, 2009, pp. 1-9.
"Response to European Communication pursuant to Article 94 (3) EPC, dated Dec. 11, 2009, Filed in the European Patent Office on Jun. 16, 2009 for EP Patent Application No. 07840692.3, corresponding to U.S. Appl. No. 11/833,839, (1-12)", 2010.
Annen, et al., "Development of Porous Zirconia Spheres by Polymerization-Induced Colloid Aggregation-Effect of Polymerization Rate", *Journal of Mater. Sci.*, 29(23):6123-6130 (1994).
Anon,, "Beatrice Biodiesel Selects Axens Exterfip-H Technology", *Biodiesel Magazine* Jun. 2006, Unknown.
BCC Research, "Global Market for Catalyst Regeneration", MarketResearch.com http://www.marketresearch.com/product/display.asp?productid=1354464 2006, 1-20, 2010.
Blackwell, J. A. et al., "A Chromatographic Study of the Lewis Acid-Base Chemistry of Zirconia Surfaces", *J. Liquid Chromatog.* 1991, 14: 2875-2889.
Blackwell, J. A. et al., "Study of the Fluoride Adsorption Characterisitics of Porous Microparticulate Zirconium Oxide", *J. Chromatog.* 1991, 549: 43-57.
Bournay, L. et al., "New Heterogeneous Process for Biodiesel Production: A Way to Improve the Quality and the Value of the Crude Glycerin Produced by Biodiesel Plants", *Catalysis Today* 2005, 106: 190-192.
Brown, Adrian S. et al., "Sulfated Metal Oxide Catalysts: Superactivity through Superacidity?", *Green Chemistry* Feb. 1999, 17-20.
Bryan, Tom, "Adsorbing It All", *Biodiesel Magazine* Mar. 2005, 40-43.
Cao, W. et al., "Preparation of Biodiesel from Soybean Oil Using Supercritical Methanol and Co-Solvent", *Fuel* 2005, 84: 347-351.
Collins, K., "Statement of Keith Collins, Chief Economist, U.S. Department of Agriculture before the U.S. Senate Committee on Appropriations, Subcommittee on Agriculture, Rural Development, and Related Agencies: Economic Issues Related to Biofuels.", *Unknown* www.usda.gov/documents/Farmbill07energy.doc. Aug. 26, 2006, 1-8 (web).
Dean, Morgan et al., "Nanocrystalline Metal Oxide-Based Catalysts for Biodiesel Production from Soybean Oil", *#96—Student Poster Session: Catalysis & Reaction Engineering* (04016) http://aiche.confex.com/aiche/2006/techprogram/P78366.HTM Nov. 13, 2006, 1 (web).
Demirbas, Ayhan, "Biodiesel fuels from vegetable oils via catalytic and non-catalytic supercritical alcohol transesterifications and other methods: a survey", *Energy Conversion & Management* 2003, issue 44 pp. 2093-2109.
Di Serio, et al., "Synthesis of Biodiesel via Homogeneous Lewis Acid Catalyst", *J. Molec. Catal. A Chem.* 2005, 239: 111-115.
Di Serio, M. et al., "Transesterification of Soybean Oil to Biodiesel by Using Heterogeneous Basic Catalysts", *Ind. Eng. Chem. Res.* 2006, 45: 3009-3014.
Dorsa, Renato et al., "Basics of Alkali Refining of Vegetable Oils", *GEA Westfalia Separator Food Tec GmbH* Unknown, 1-28, 2010.
Dunlap, C. J. et al., "Zirconia Stationary Phases for Extreme Separations", *Anal. Chem.* 2001, 73: 598A-607A.
Elliott, Brian, "Low-cost Biodiesel Production Process Using Waste Oils and Fats", *U.S. EPA SBIR Phase I Kick-Off Meeting* www.iastate.edu/Inside/2003/0613/biorenewable.jpg Apr. 5, 2007, 1.
Fabbri, D. et al., "'Dimethyl carbonate as a novel methylating reagent for fatty acids in analytical pyrolysis'", *Journal of Chromatography, Elsevier Science Publishers B.V. NL LNKDDOI:10.1016/J. CHROMA.2004.12.077* Feb. 18, 2005.
Furuta, S. et al., "Biodiesel Fuel Production with Solid Superacid Catalysis is Fixed Bed Reactor Under Atmospheric Pressure", *Catalysis Communications* 2004, 5: 721-723.
Gercel, H. F. et al., "Hydropyrolysis of Extracted Euphorbia rigida in a Well-Swept Fixed-Bed Tubular Reactor", *Energy Sources* 2002, 24: 423-430.
Goering, C. E. et al., "Fuel Properties of Eleven Vegetable Oils", *Trans ASAE* 1982, 25: 1472-1477.
Goodwin, J. G., "Research Activities: Biodiesel Synthesis", *Chemical and Biomolecular Engineering at Clemson University* http://www.ces.clemson.edu/chemeng/facultypages/goodwin/research.html 2006, 1-5.
Haas, M. J. et al., "Engine Performance of Biodiesel Fuel Prepared from Soybean Soapstack: A High Quality Renewable Fuel Produced from a Waste Feedstock", *Energy Fuels* 2001, 15: 1207-1212.
Haas, M. J. et al., "Improving the Economics of Biodiesel Production Through the Use of Low Value Lipids as Feedstocks: Vegetable Oil soapstock", *Fuel Process. Technol.* 2005, 86: 1087-1096.
Harvey, A. P. et al., "Process Intensification of Biodiesel Production Using a Continuous Oscillatory Flow Reactor", *J. Chem. Technol. Biotechnol.* 2003, 78: 338-341.
He, Chen et al., "Biodiesel from Transesterification of Cotton Seed Oil by Solid Bases Catalysis", *Journal of Chemical Engineering of Chinese Universities* Aug. 2006, No. 4 vol. 20.
He, Chen et al., "Biodiesel Production by the transesterification of cottonseed oil by solid acid catalysts", *Frontiers of Chemical Engineering in China* Feb. 2006, vol. 1, No. 1, pp. 1673-7369.
Henry, R. A. et al., "A Novel Chemical Route to Stable, Regenerable Zirconia-Based Chiral Stationary Phases for HPLC", *American Laboratory (News Edition)* 2005, 37: 22-24.
Hill, J. et al., "Environmental, Economic, and Energetic Costs and Benefits of Biodiesel and Ethanol Biofuels", *PNAS* 2006, 103(30): 11206-11210.
Iijima, Wataru et al., "'Winterized' Bio-Diesel Fuel Produced from Animal Fat", *Agro-Energy Laboratory, Dept. of Farm Mechanization and Engineering, National Agricultural ResearchCentre, National Agricultural Research Organization*, JAPAN Unknown, 1-2, 2010.
Iijima, Wataru et al., "The Non-glycerol Process of Biodiesel Fuel Treated in Supercritical Methanol (Abstract)", *Paper No. 046073, 2004 ASAE Annual Meeting* 2004, 1.
Ishihara, K. et al., "Direct Ester Condensation from a 1:1 Mixture of Carboxylic Acids and Alcohols Catalyzed by Hafnium (IV) or Zirconium (IV) Salts.", *Tetrahedron* 2002, 58: 8179-8188.

Kahn, A., "Research into Biodiesel Catalyst Screening and Development", *Thesis, University of Queensland Brisbane* 2002, 1-41.

Kiss, Anton A. et al., "Solid Acid Catalysts for Biodiesel Production—Towards Sustainable Energy", *Adv. Synth. Catal.* 2006, 348: 75-81.

Knothe, G., "Analytical Methods Used in the Production and Fuel Quality Assessment of Biodiesel", *Transactions of the ASAE* 2001, 44(2): 193-200.

Knothe, Gerhard et al., "Bidiesel: The Use of Vegetable Oils and Their Derivatives as Alternative Diesel Fuels", *Oil Chemical Research, National Center for Agricultural Utilization Research, Agricultural Research Service, U.S. Department of Agriculture*, Peoria, IL 61604 Unknown, 1-36, 2010.

Koh, Ashley D., "Non-Catalytic Biodiesel Production from Soybean Oil Using Supercritical Methanol", *The 2006 Annual Meeting San Francisco, CA* http://aiche.confex.com/aiche/2006/techprogram/P69978.HTM presented Nov. 15, 2006, 1.

Kulkarni, Mangesh G. et al., "Solid Acid Catalyxed Biodiesel Production by Simultaneous Esterification and Transesterification", *Green Chem.* 2006, 8: 1056-1062.

Kulkarni, M. et al., "Waste Cooking Oil: An Economical Source for Biodiesel", *Ind. Eng. Chem. Res.* 2006, 45: 2901-2913.

Liu, Yijun et al., "Transesterification of Poultry Fat with Methanol Using Mg-Al Hydrotalcite Derived Catalysts", *Applied Catalysis A: General* (Abstract only) 2007, vol. 331, 138-148.

Lopez, Dora E. et al., "Esterification and transesterification on tungstated zirconia: Effect of calcination temperature", *Journal or Catalysis* Apr. 1, 2007, vol. 247, Iss. 1, 43-50.

Lopez, D.E. et al., "Transesterification of Triacetin with Methanol on Solid Acid and Base Catalysts", *Appl. Catalysis A: General* 2005, 295: 97-105.

Lotero, E. et al., "Synthesis of Biodiesel Via Acid Catalysis", *Ind. Eng. Chem. Res.* 2005, 44:5353-5363.

Ma, R et al., "Biodiesel Production: A Review", *Bioresource Technol.* 1999, 70:1-15.

Miller, Dennis J. et al., "Catalysis for Biorenewables Conversion", *National Science Foundation Workshop Report* www.egr.msu.edu/apps/nsfworkshop Apr. 13, 2004, 1-63 (web).

Mittelbach, Martin et al., "Diesel Fuel Derived from Vegetable Oils, III. Emission Tests Using Methyl Esters of Used Frying Oil", *JAOCS* Jul. 1988, vol. 65, No. 7, 1185-1187.

Nawrocki, J. et al., "Chemistry of Zirconia and Its Use in Chromatography", J. Chromatog. 1993, A 657: 229-282.

Omota, F. et al., "Fatty Acid Esterification by Reactive Distillation: Part 2—Kinetics-based Design for Sulphated Zirconia Catalysts", *Chemical Engineering Science* 2003, 58: 3175-3185.

Ondrey, G., "Biodiesel Production Using a Heterogeneous Catalyst", *Chemical Engineering* 2004, 111(11):13.

Otera, J., "Transesterification", *Chem. Rev.* 1993, 93:1449-1470.

Peterson, C. L. et al., "Continuous Flow Biodiesel Production", *Appl. Eng. Agricul.* 2002, 18: 5-11.

Pinto, A. C. et al., "Biodiesel: An Overview", *J. Braz. Chem. Soc.* 2005, 16: 1313-1330.

Pruszko, R., "Strategic Biodiesel Decisions", *Iowa State University—University Extension* CIRAS 2006, 1-32.

Raddi De Araujo, Lucia R. et al., "H3PO4/Al2O3 Catatysts: Characterization and Catalytic Evaluation of Oleic Acid Conversion to Biofuels and Biolubricant", *Materials Research* 2006, vol. 9, No. 2, 181-184.

Reisch, Marc S., "Start-up Firms Pursue Biofuels", *Chemical & Engineering News* Nov. 20, 2006, vol. 84, No. 47, 1-2(web).

Rigney, M. P. et al., "Physical and Chemical Characterization of Microporous Zirconia", *J. Chromatog* 1990, 499: 291-304.

Robichaud, Michael J. et al., "An Improved Oil Emulsion Synthesis Method for Large, Porous Zirconia Particles for Packed- or Fluidized-Bed Protein Chromatography", *Separation Science and Technology* 1997, 32(15), pp. 2547-2559.

Schuchardt, Ulf et al., "Transesterification of Vegetable Oils: a Review", *J. Braz. Chem. Soc.* 1998, vol. 9, No. 1, 199-210.

Silva, Lisa et al., "Colorado Diesel School Bus Retrofit Program", *A Cooperative Effort of the Regional Air Quality Council and the Colorado Department of Public Health and Environment* 2006, 1-17.

Suppes, G. J. et al., "Transesterification of Soybean Oil with Zeolite and Metal Catalysts", *Applied Catalysis A: General* 2004, 257: 213-223.

Suwannakarn, Kaewta et al., "A comparative study of gas phase esterification on solid acid catalysts", *Catalysis Letters* Apr. 2007, vol. 114, Nos. 3-4, 1-7.

Tyson, K. S., "Brown Grease Feedstocks for Biodiesel", *National Renewable Energy Laboratory* Jun. 19, 2002, 1-34.

Unknown, "AMBERLITEtm FP Ion Exchange Resins", *Amberlite FP technical bulletin* http://www.advancedbiosciences.com Dec. 2004, 1-7.

Unknown, et al., "Oak Ridge lab develops materials for biodiesel catalysis", *Biodiesel Magazine* http://biodieselmagazine.com/article-print.jsp?article_id=1580 2007, 1.

Unknown, "Standard Test Method for Acid Number of Petroleum Products by Potentiometric Titration", *ASTM International, Designation: D664-04* Mar. 2004, 1-7.

Verkade, J. G. et al., "Nanoporous Solid Catalysts for Conversion of Soybean Oil to Biodiesel", *Center for Catalysis, Iowa State University* http://www.iprt.iastate.edu/ccat/nano.html Feb. 22, 2006, 1-4.

Vieitez, Ignacio et al., "Continuous Production of Soybean Biodiesel in Supercritical Ethanol-Water Mixtures", *American Chemical Society, Energy & Fuels* Jun. 17, 2008, pp. 1-5.

Xie, W. et al., "Synthesis of Biodiesel from Soybean Oil Using Heterogeneous KF/ZnO Catalyst", *Catalyst Letters* Feb. 2006, 107: 53-59.

Yokoyama, Shin-Ya et al., "Liquid Fuel Production from Ethanol Fermentation Stillage", *Chemistry Letters* 1986, pp. 649-652.

Zhang, P., "A New Process for Biodiesel Production Based on Waste Cooking Oils and Heterogeneous Catalysts", *USDA-SBIR Agreement #2005-33610-15497* 2005, 1-2.

"Final Office Action", mailed May 26, 2011 in co-pending U.S. Appl. No. 12/030,801, "Devices and Methods for Selective Removal of Contaminants from a Composition" (21 pages).

"Notice of Allowance Received", Mailed May 11, 2011 in co-pending U.S. Appl. No. 12/540,568, "Systems for Selective Removal of Contaminants from a Composition and Methods of Regenerating The Same" (20 pages).

"PCT Notification Concerning Transmittal of International Preliminary Report on Patentability", from International Application No. PCT/US2010/38000, corresponding to U.S. Appl. No. 61/185,453, mailed Dec 22, 2011, pp. 1-6.

\* cited by examiner

FIG. II

SYSTEMS AND METHODS FOR REFINING ALKYL ESTER COMPOSITIONS

This application is a continuation-in-part of U.S. patent application Ser. No. 11/833,839, filed Aug. 3, 2007, which claims the benefit of U.S. Provisional Pat. App. No. 60/821,498, filed Aug. 4, 2006, U.S. Provisional Pat. App. No. 60/825,575, filed Sep. 13, 2006, and U.S. Provisional Application No. 60/889,730, filed Feb. 13, 2007; this application also claims the benefit of U.S. Provisional App. No. 61/185,453, filed Jun. 9, 2009; the contents of all of which are herein incorporated by reference in their entirety.

FIELD OF THE INVENTION

The present invention relates to systems for refining chemical compositions. More specifically, the present invention relates to systems and methods for producing and refining alkyl ester compositions.

BACKGROUND OF THE INVENTION

ASTM guidelines for biodiesel fuel place strict limits on the concentration of free fatty acids that can be present. This is because free fatty acids can contribute to corrosion of engine parts.

However, some methods of producing alkyl ester compositions can result in an unacceptably high concentration of free fatty acids. This is particularly true where the lipid feedstock used to create the alkyl ester composition is high in free fatty acids to begin with.

SUMMARY OF THE INVENTION

The present invention relates to systems and methods for producing and/or refining alkyl ester compositions. In an embodiment the invention includes a method of producing a refined fatty acid alkyl ester composition. The method can include contacting a fatty acid feedstock and an alcohol with a first metal oxide catalyst at a temperature of greater than 200 degrees Celsius and a pressure of greater than 500 psi to form an unrefined fatty acid alkyl ester composition. The method can further include combining the unrefined fatty acid alkyl ester composition with dimethyl carbonate to form a refining mixture. The method can also include contacting the refining mixture with a second metal oxide catalyst at a temperature of greater than 100 degrees Celsius to form a refined fatty acid alkyl ester composition.

In an embodiment, the invention includes a method of refining a fatty acid alkyl ester feedstock. The method can include combining a fatty acid alkyl ester composition having an acid number of greater than 0.5 mg KOH/g oil with dimethyl carbonate to form a refining mixture. The method can further include contacting the refining mixture with a metal oxide substrate at a temperature of greater than about 100 degrees Celsius to form a refined fatty acid alkyl ester composition having an acid number less than or equal to 0.5 mg KOH/g oil.

In an embodiment, the invention can include a system for producing a refined oil product. The system can include a production reactor for producing a crude oil product mixture, the reactor comprising a production housing defining an interior volume, metal oxide media disposed within the production housing, a lipid reservoir in fluid communication with the production reactor, and an alcohol reservoir in fluid communication with the production reactor. The system can also include a refinement reactor in fluid communication with the production reactor, the organic acid removal reactor comprising a refinement housing defining an interior volume, the refinement housing configured to receive the crude oil product mixture from the production reactor, metal oxide media disposed within the interior volume of the refinement housing, and a dimethyl carbonate reservoir in fluid communication with the refinement reactor.

In an embodiment, the invention can include a device for removal of free organic acids from a crude product mixture. The device can include a production housing defining an interior volume, an input port, and an output port. The device can further include metal oxide media disposed within the production housing, the metal oxide media comprising a metal oxide selected from the group consisting of zirconia, alumina, hafnia, and titania. The device can further include a temperature control unit configured to maintain the temperature within the production housing at greater than about 200 degrees Celsius. The device can also include a refinement housing defining an interior volume, an input port, and an output port. Metal oxide media can be disposed within the production housing, the metal oxide media comprising a metal oxide selected from the group consisting of zirconia, alumina, hafnia, and titania. The device can also include a temperature control unit configured to maintain the temperature within the production housing at greater than about 100 degrees Celsius; and a dimethyl carbonate reservoir in fluid communication with the refinement housing.

The above summary of the present invention is not intended to describe each discussed embodiment of the present invention. This is the purpose of the figures and the detailed description that follows.

BRIEF DESCRIPTION OF THE FIGURES

The invention may be more completely understood in connection with the following drawings, in which.

While the invention is susceptible to various modifications and alternative forms, specifics thereof have been shown by way of example and drawings, and will be described in detail. It should be understood, however, that the invention is not limited to the particular embodiments described. On the contrary, the intention is to cover modifications, equivalents, and alternatives falling within the spirit and scope of the invention.

DETAILED DESCRIPTION OF THE INVENTION

The embodiments of the present invention described herein are not intended to be exhaustive or to limit the invention to the precise forms disclosed in the following detailed description. Rather, the embodiments are chosen and described so that others skilled in the art can appreciate and understand the principles and practices of the present invention.

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

As described above, some methods of producing alkyl ester compositions typically result in an unacceptably high concentration of free fatty acids. This is particularly true where the lipid feedstock used to create the alkyl ester composition is high in free fatty acids. However, in accordance with various embodiments herein, dimethyl carbonate can be used in a process for removing free fatty acids from alkyl ester compositions. As such, embodiments herein can be used to refine alkyl ester compositions so that they meet specifications for biodiesel fuel.

Figure 1:
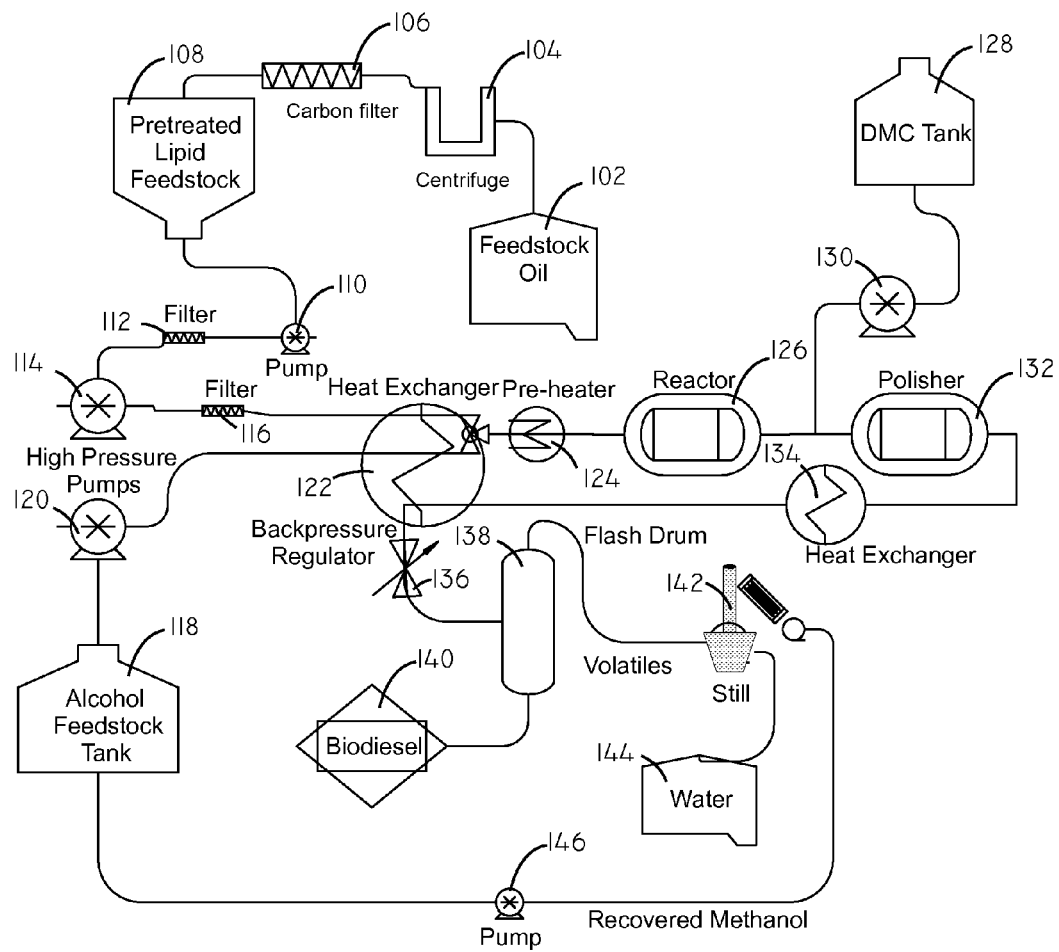
FIG. 1 is a process flow diagram of a system in accordance with an embodiment of the invention.

Referring now to FIG. 1, a process flow diagram is shown of a system in accordance with an embodiment of the invention. The system can operate as a continuous biodiesel production process. A lipid feedstock can be held in a lipid feedstock tank 102. Examples of lipid feed stocks are described in greater detail below. From the lipid feedstock tank 102, the lipids can optionally pass through a centrifuge 104 in order remove particulate material. Optionally, the lipid feedstock can also pass through a filter 106, such as a carbon filter or particulate filter, before entering a pretreated lipid feedstock tank 108.

From the pretreated lipid feedstock tank 108, the lipid feedstock can pass through a pump 110 and optionally another filter 112. The lipid feedstock can then pass through a high pressure pump 114 and optionally through another filter 116 before entering a heat exchanger 122 where the lipid feedstock can absorb heat from effluent reaction products.

An alcohol can be stored in an alcohol feedstock tank 118. Exemplary alcohols are described in greater detail below. The alcohol feedstock can then pass through a high pressure pump 120 before also entering the heat exchanger 122. The lipid feedstock and the alcohol can then pass through a preheater 124. The preheater 124 can serve to raise the temperature of the lipid feedstock and the alcohol to a desired level before further processing. After the preheater, the lipid feedstock and the alcohol can enter a reactor. The reactor can include a metal oxide media as a catalyst. Exemplary metal oxides are described in greater detail below. Details regarding exemplary reactors are described in US 2008/0051592, the content of which is herein incorporated by reference in its entirety. The temperature within the reactor can be greater than about 200 degrees Celsius. The pressure within the reactor can be greater than about 500 psi. In some embodiments, the temperature and/or pressure within the reactor can be supercritical for the alcohol used.

The reaction product mixture coming out of the reactor 126 can include fatty acid alkyl esters along with some residual amount of free fatty acids. An additive, such as dimethyl carbonate (DMC) can be stored in supply tank 128. The DMC can pass through a pump 130 before being combined with the reaction product mixture leaving the reactor 126. Various mole ratios of DMC to free fatty acids can be used. By way of example, in some embodiments, the amount of dimethyl carbonate (DMC) is in a molar ratio with the free fatty acid greater than or equal to 1:1 free fatty acid:DMC. In some embodiments, the amount of dimethyl carbonate (DMC) is in a molar ratio with the free fatty acid greater than or equal to 1:3 free fatty acid:DMC.

The DMC and the reaction product mixture can then enter a polisher 132 (or refinement reactor) before entering a heat exchanger 134. The polisher 132 can include a metal oxide catalyst. The metal oxide catalyst can be the same or different than the metal oxide catalyst in the reactor 126. The DMC can react with free fatty acids in the reaction product mixture such that the amount of free fatty acids is reduced. The temperature within the polisher can be greater than about 100 degrees Celsius. In some embodiments, the temperature can be between about 150 degrees Celsius and 220 degrees Celsius. In some embodiments, the temperature can be between about 170 degrees Celsius and 180 degrees Celsius. In some embodiments, the temperature can be about 175 degrees Celsius.

The pressure within the polisher can be greater than about 300 PSI. In some embodiments, the pressure is greater than or equal to 500 PSI. In some embodiments, the pressure is greater than or equal to 700 PSI.

As shown in the examples below, the contact time (or mean residence time) of the refining mixture with the metal oxide catalyst can impact the degree to which the acid number is reduced. The mean residence time can be calculated by dividing the volume of the refining mixture that the polisher (or refinement reactor) can hold by the flow rate of the system. In some embodiments, the residence time is less than or equal to 120 minutes. In some embodiments, the residence time is less than or equal to 60 minutes. In some embodiments, the residence time is less than or equal to 45 minutes. In some embodiments the residence time is greater than 1 minute. In some embodiments the residence time is greater than 5 minutes. In some embodiments the residence time is greater than 10 minutes.

The refined product mixture can pass back through the first heat exchanger 122 and then a backpressure regulator 136, before entering a separation device such as a flash drum 138. Refined alkyl esters, sometimes referred to as biodiesel, can then pass to a storage tank 140. Volatiles separated out by the flash drum can then pass through a still 142 in order to separate water from residual alcohol. The water 144 can be stored or pumped out. The alcohol can pass through another pump 146 before being returned to the alcohol feedstock tank 118.

Metal oxides used with embodiments of the invention can include metal oxides with surfaces including Lewis acid sites, Lewis base sites, Brønsted base sites, and Brønsted acid sites (zwitterionic). By definition, a Lewis acid is an electron pair acceptor. A Brønsted base is a proton acceptor and a Brønsted acid is a proton donor. Metal oxides of the invention can specifically include zirconia, alumina, titania and *hafnia*. Metal oxides of the invention can specifically include oxides of Group IV metals. Metal oxides of the invention can also include silica clad with a metal oxide selected from the group consisting of zirconia, alumina, titania, *hafnia*, zinc oxide, copper oxide, yttria, lanthanum oxide, magnesium oxide and iron oxide. In some embodiments, metal oxides of the invention can include mixtures of metal oxides, such as mixtures of zirconia, alumina, titania and/or *hafnia*. In other embodiments, the metal oxides used can be substantially pure metal oxides, such as substantially pure zirconia, alumina, titania and/or *hafnia*. Of the various metal oxides that can be used with embodiments of the invention, zirconia, titania and *hafnia* are advantageous as they are very chemically and thermally stable and can withstand very high temperatures and pressures as well as extremes in pH.

Metal oxides of the invention can include metal oxide particles clad with carbon. Carbon clad metal oxide particles can be made using various techniques such as the procedures described in U.S. Pat. Nos. 5,108,597; 5,254,262; 5,346,619; 5,271,833; and 5,182,016, the contents of which are herein incorporated by reference. Carbon cladding on metal oxide particles can render the surface of the particles more hydrophobic.

Metal oxide media of the invention can be made in various ways. As one example, a colloidal dispersion of zirconium dioxide can be spray dried to produce aggregated zirconium dioxide particles. Colloidal dispersions of zirconium dioxide are commercially available from Nyacol Nano Technologies, Inc., Ashland, Mass. The average diameter of particles produced using a spray drying technique can be varied by changing the spray drying conditions. Examples of spray drying techniques are described in U.S. Pat. No. 4,138,336 and U.S. Pat. No. 5,108,597, the content of both of which are herein incorporated by reference. It will be appreciated that other methods can also be used to create metal oxide particles. One example is an oil emulsion technique as described in Robichaud et al., Technical Note, "An Improved Oil Emulsion Synthesis Method for Large, Porous Zirconia Particles for Packed- or Fluidized-Bed Protein Chromatography," Sep. Sci. Technol. 32, 2547-59 (1997). A second example is the formation of metal oxide particles by polymer induced colloidal aggregation as described in M. J. Annen, R. Kizhappali, P. W. Carr, and A. McCormick, "Development of Porous Zirconia Spheres by Polymerization-Induced Colloid Aggregation-Effect of Polymerization Rate," J. Mater. Sci. 29, 6123-30 (1994). A polymer induced colloidal aggregation technique is also described in U.S. Pat. No. 5,540,834, the content of which is herein incorporated by reference.

Metal oxide media used in embodiments of the invention can be sintered by heating them in a furnace or other heating device at a relatively high temperature. In some embodiments, the metal oxide is sintered at a temperature of 160° C. or greater. In some embodiments, the metal oxide is sintered at a temperature of 400° C. or greater. In some embodiments, the metal oxide is sintered at a temperature of 600° C. or greater. Sintering can be done for various amounts of time depending on the desired effect. Sintering can make metal oxide media more durable. In some embodiments, the metal oxide is sintered for more than about 30 minutes. In some embodiments, the metal oxide is sintered for more than about 3 hours. However, sintering also reduces the surface area. In some embodiments, the metal oxide is sintered for less than about 1 week.

In some embodiments, the metal oxide media is in the form of particles. Particles within a desired size range can be specifically selected for use in embodiments herein. For example, particles can be sorted by size such as by air classification, elutriation, settling fractionation, or mechanical screening. In some embodiments, the size of the particles is greater than about 0.2 µm. In some embodiments, the size range selected is from about 0.2 µm an to about 2 mm. In some embodiments, the size range selected is from about 150 µm to about 250 µm.

It can be desirable to maximize the surface area of the metal oxide media so that the amount of organic acids bound by the media is maximized. As such, in some embodiments, metal oxide media used with embodiments of the invention includes porous particles. By way of example, in some embodiments the metal oxide particles can have an average pore size of about 30 angstroms to about 2000 angstroms. However, in other embodiments, the metal oxide particles used are non-porous.

The Lewis acid sites on metal oxides of the invention can interact with Lewis basic compounds. Thus, Lewis basic compounds can be bonded to the surface of metal oxides of the invention. A Lewis base is an electron pair donor. Lewis basic compounds of the invention can include anions formed from the dissociation of acids such as hydrobromic acid, hydrochloric acid, hydroiodic acid, nitric acid, sulfuric acid, perchloric acid, boric acid, chloric acid, phosphoric acid, pyrophosphoric acid, methanethiol, chromic acid, permanganic acid, phytic acid and ethylenediamine tetramethyl phosphonic acid (EDTPA). Lewis basic compounds of the invention can also include hydroxide ion as formed from the dissociation of bases such as sodium hydroxide, potassium hydroxide, lithium hydroxide and the like.

The anion of an acid can be bonded to a metal oxide of the invention by refluxing the metal oxide in an acid solution. By way of example, metal oxide particles can be refluxed in a solution of sulfuric acid. Alternatively, the anion formed from dissociation of a base, such as the hydroxide ion formed from dissociation of sodium hydroxide, can be bonded to a metal oxide by refluxing in a base solution. By way of example, metal oxide particles can be refluxed in a solution of sodium hydroxide. The base or acid modification can be achieved under exposure to the acid or base in either batch or continuous flow conditions when disposed in a reactor housing at elevated temperature and pressure to speed up the adsorption/modification process. In some embodiments, fluoride ion, such as formed by the dissociation of sodium fluoride, can be bonded to the particles.

In some embodiments, metal oxide particles can be packed into a housing, such as a column or bed. Disposing metal oxide particles in a housing is one approach to facilitating continuous flow processes. Many different techniques may be used for packing the metal oxide particles into a housing. The specific technique used may depend on factors such as the average particle size, the type of housing used, etc. Generally speaking, particles with an average size of about 1-20 microns can be packed under pressure and particles with an average size larger than 20 microns can be packed by dry-packing/tapping methods or by low pressure slurry packing. In some embodiments, the metal oxide particles of the invention can be impregnated into a membrane, such as a PTFE membrane.

In some embodiments, metal oxide media used with embodiments of the invention is not in particulate form. For example, a layer of a metal oxide can be disposed on a substrate in order to form media used with embodiments of the invention. The substrate can be a surface that is configured to contact the unrefined chemical composition during processing. In one approach, metal oxide media can be disposed as a layer over a surface of a housing that contacts the unrefined chemical composition. Alternatively, the metal oxide media can be embedded as a particulate in the surface of an element that is configured to contact the unrefined chemical composition during processing.

Lipid Feed Stocks

Lipid feed stocks used in embodiments of the invention can be derived from many different sources. In some embodiments, lipid feed stocks used in embodiments of the invention can include biological lipid feed stocks. Biological lipid feed stocks can include lipids (fats or oils) produced by any type of microorganism, fungus, plant or animal. In an embodiment, the biological lipid feed stocks used include triglycerides. Many different biological lipid feed stocks derived from plants can be used. By way of example, plant-based lipid feed stocks can include rapeseed oil, soybean oil (including degummed soybean oil), canola oil, cottonseed oil, grape seed oil, mustard seed oil, corn oil, linseed oil, safflower oil, sunflower oil, poppy-seed oil, pecan oil, walnut oil, oat oil, peanut oil, rice bran oil, camellia oil, castor oil, and olive oil, palm oil, coconut oil, rice oil, algae oil, seaweed oil, Chinese Tallow tree oil. Other plant-based biological lipid feed stocks can be obtained from argan, avocado, babassu palm, balanites, borneo tallow nut, brazil nut, *calendula*, camelina, caryocar, cashew nut, chinese vegetable tallow, cocoa, coffee, cohune palm, coriander, cucurbitaceae, *euphorbia*, hemp, illipe, jatropha, jojoba, kenaf, kusum, *macadamia* nuts, mango seed, noog abyssinia, nutmeg, opium poppy, *perilla*, pili nut, pumpkin seed, rice bran, sacha inche, seje, sesame, shea nut, teased, allanblackia, almond, chaulmoogra, *cuphea*, jatropa curgas, karanja seed, neem, papaya, tonka bean, tung, and ucuuba, cajuput, clausena anisata, davana, galbanum natural oleoresin, german chamomile, hexastylis, high-geraniol monarda, juniapa-hinojo sabalero, lupine, *melissa officinalis*, milfoil, ninde, patchouli, tarragon, and wormwood.

Many different lipid feed stocks derived from animals can also be used. By way of example, animal-based biological lipid feed stocks can include choice white grease, lard (pork fat), tallow (beef fat), fish oil, and poultry fat.

Many different lipid feed stocks derived from microorganisms (Eukaryotes, Eubacteria and Archaea) can also be used. By way of example, microbe-based lipid feed stocks can include the L-glycerol lipids of Archaea and algae and diatom oils. Many different lipid feed stocks derived from fungus (e.g. Yeasts) can also be used.

In some embodiments, lipid feed stocks derived from both plant and animal sources can be used such as yellow grease, white grease, and brown grease. By way of example, yellow, white or brown grease can include frying oils from deep fryers and can thus include fats of both plant and animal origin. Lipid feed stocks can specifically include used cooking oil. Brown grease (also known as trap grease) can include fats extracted from waste water treatment and sewage systems and can thus include fats of both plant and animal origin. In some embodiments, lipid feed stocks used in embodiments of the invention can include non-biological lipid feed stocks. Lipid feed stocks of the invention can include black oil.

In some embodiments, lipid feed stocks can be derived from microorganisms such as bacteria, protozoa, algae, and fungi. Lipid feed stocks of the invention can also include soap stock and acidulated soap stock.

Lipid feed stocks used with embodiments of the invention can specifically include low value feed stocks. Low value feed stocks, such as various types of animals fats and waste oils, generally have a relatively high concentration of free fatty acids. One method of assessing the concentration of free fatty acids is to determine the acid number (or acid value) of the feed stock. The acid number is the mass of potassium hydroxide (KOH) in milligrams that is required to neutralize one gram of the chemical substance being assessed. The precise acid number as measured can vary because of the heterogeneity of the lipid feed stock. However, as an example, a high value feed stock such as virgin soybean oil can have an acid number of about 0.35 whereas a lower value feed stock such as swine tallow can have an acid number of about 5. Yellow grease, a low value feed stock, can have an acid number of about 15 while acidulated soap stock, also a low value feed stock, can have an acid number of about 88.

In some embodiments, the lipid feed stock used has an acid number of about 3 (mg KOH/g oil) or greater. In some embodiments, the lipid feed stock used has an acid number of about 5 (mg KOH/g oil) or greater. In some embodiments, the lipid feed stock used has an acid number of about 10 (mg KOH/g oil) or greater. In some embodiments, the lipid feed stock used has an acid number of about 50 (mg KOH/g oil) or greater.

Embodiments herein can be used to reduce the acid number of various compositions. By way of example, embodiments here can be used to reduce the acid number of biodiesel compositions, pyrolysis oil (bio-oil), and the like.

Alcohols

Alcohols used in some embodiments of the invention can include many different types of alcohols. By way of example, alcohols used in some embodiments of the invention can include alcohols having from one to six carbon atoms. For example, in some embodiments, methanol is used. Methanol can be advantageous as the resulting alkyl esters (methyl esters) have a lower viscosity than higher alkyl esters. However, in some embodiments ethanol is used. Ethanol has low toxicity and is readily produced from plant matter by fermentation processes.

In some embodiments, a single alcohol is used. In other embodiments, a mixture of different alcohols is used. By way of example, a mixture of methanol and a higher molecular weight alcohol can be used. Such a mixture can offer the advantage of being more miscible with the biological lipid feed stock than methanol alone.

The present invention may be better understood with reference to the following examples. These examples are intended to be representative of specific embodiments of the invention, and are not intended as limiting the scope of the invention.

EXAMPLES

Example 1

Titania Particles

Titania particles were purchased from Sachtleben Co. in Germany. Table 1 shows the physical characteristics of the porous titania particles.

TABLE 1

| | |
|---|---|
| Surface area (m^2/g) | 100 |
| Pore volume (mL/g) | 0.12 |
| Pore diameter (angstrom) | 60 |
| Internal Porosity | 0.32 |
| Average size (micron) | 80 |

Example 2

Formation of a Packed Refinement Reactor 15.97 g of titania particles (80 μm/60 Å) from Example 1 were packed in a 150 mm length by 10 mm. i.d. reactor (Reactor series No. TI042109A) by dry packing with a shaker machine.

Example 3

Continuous Production of Alkyl Esters from Fatty Acids in Biodiesel Using Dimethyl Carbonate (DMC)

Figure 2:
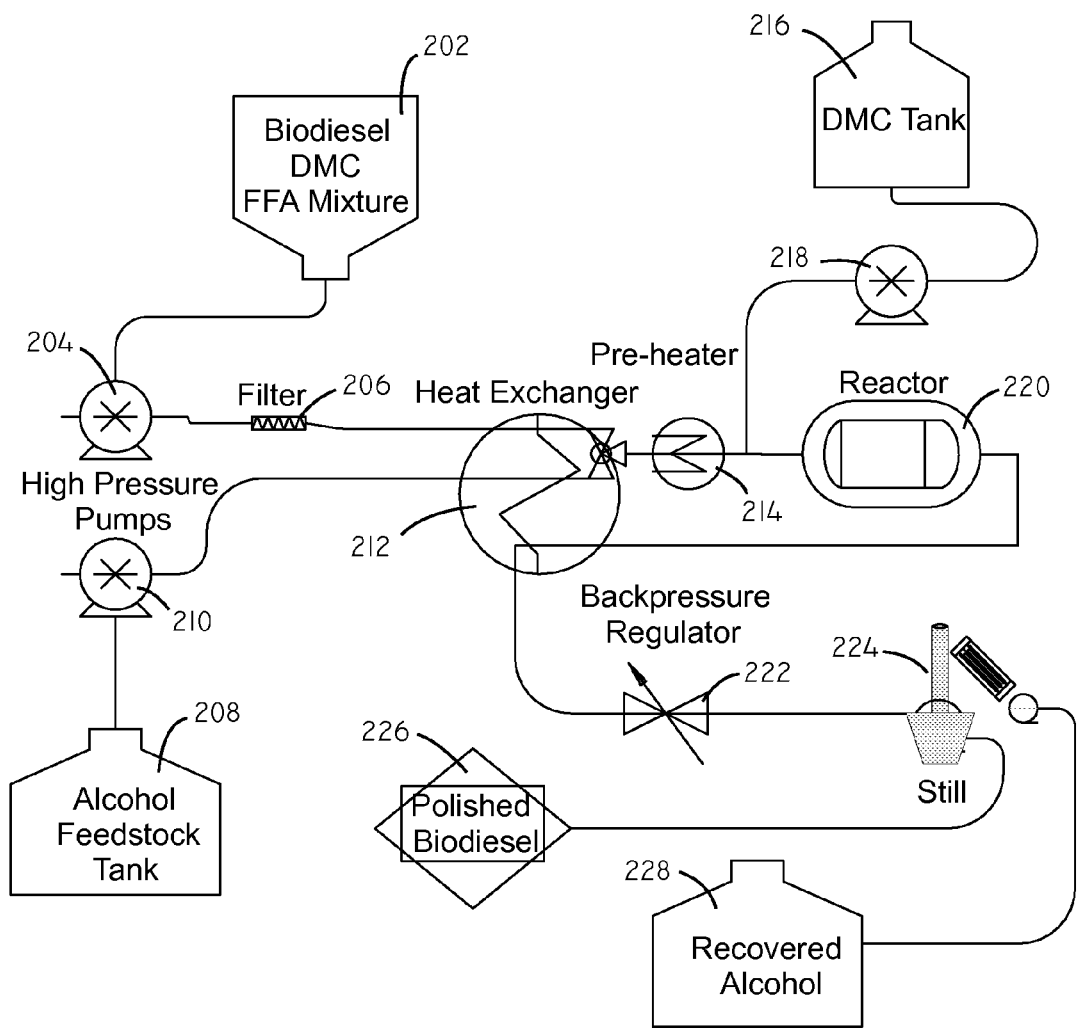
FIG. 2 is a process flow diagram of a system in accordance with another embodiment of the invention.

A continuous biodiesel production process was used for the esterfication of free fatty acids (FFAs). A process flow diagram of the system is shown in FIG. 2.

A premixed DMC-biodiesel solution consisting of different amount of DMC in biodiesel having an initial acid number of 10.31, and without methanol and water was prepared, yielding 1:3.6, 1:2.16, 1:1.44, 1:1 molar ratios of DMC to free fatty acids (FFAs). The premixed solutions were then stored (separately during different experimental runs) in a feedstock tank 202.

The DMC-biodiesel solution was pumped into one ⅛th inch o.d. stainless steel tube (Alltech Associates, Deerfield, Ill.) using one high pressure Waters 590 HPLC pump 204 obtained from Waters Corporation (Milford, Mass.). The reactant mixture was passed through an electrically driven, preheater 214 with the capability of bringing the reactants to the desired set point temperature before entering the independently thermostated fixed bed catalytic reactor prepared as described in Example 2. The custom preheater consisted of wound ⅛ inch o.d. stainless steel HPLC tubing in a grooved aluminum cylindrical block with an 800 watt Watlow heater in the center of the cylinder. The temperature control of the column was achieved using ten of one inch length by 2.5 i.d. band heaters (Applied Thermal Systems, MN).

The hot solution coming out from the reactor 220 was passed through a heat exchanger 212 using water as coolant to bring the hot effluent to room temperature. The backpressure of the system was maintained through the use of a backpressure regulator 222 obtained from Tescom (Elk River, Minn.). The as-made fuel was collected in a flask and the fuel was distilled 224 under vacuum (120 mbar) at 95° C. to remove the residual DMC and methanol.

The total acid number (TAN) was measured for each fraction collected using a Tiamo Titration System (Mettler-Toledo) based on ASTM D664. The reaction conditions were as follows: The preheater temperature was 260 degrees Celsius, the reactor inlet temperature was 301 degrees Celsius, the reactor middle temperature was 260 degrees Celsius, the reactor outlet temperature was 298 degrees Celsius, the front pressure was 2400, the residence time was approximately 30 seconds. For a first group of nine samples the mole ratio was 1:3.6. For a second group of nine samples the mole ratio was 1:2.16. For a third group of nine samples the mole ratio was 1:1.44. For a fourth group of nine samples the mole ratio was 1:1.

Figure 3:
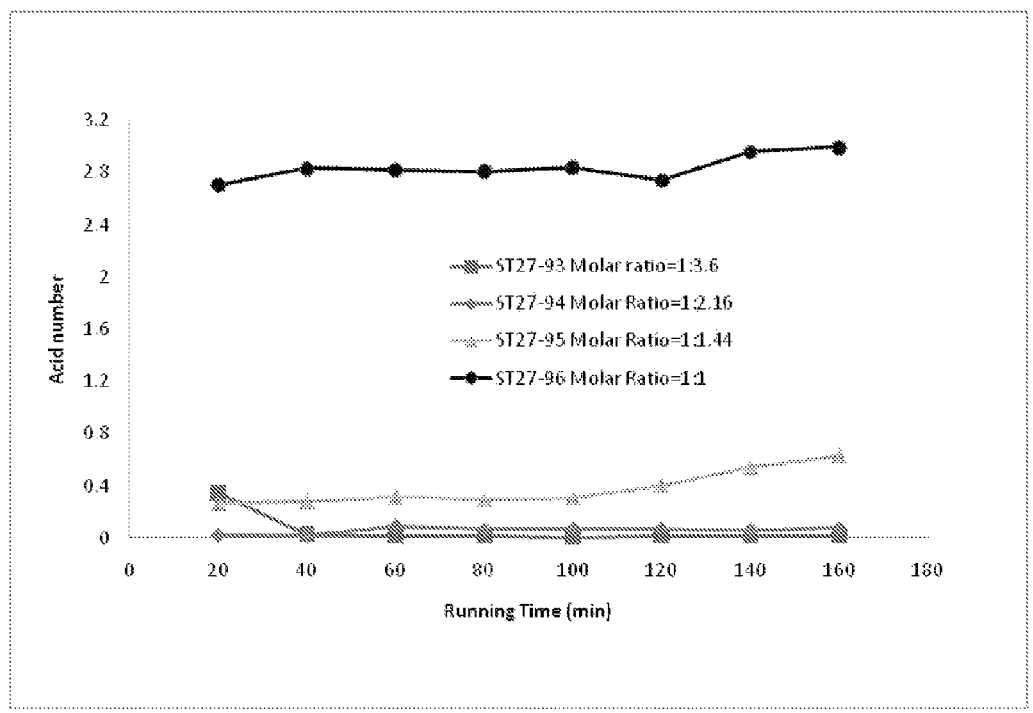
FIG. 3 is a graph of the acid number of samples as processed by an embodiment of a system described herein.

The results are shown in FIG. 3. FIG. 3 shows that acid number of the as-made biodiesel was decreased during 3-hour testing. Thus, the esterification of FFAs in biodiesel was achieved successfully at molar ratios of 1:3.6 1:2.16 and 1:1.44 and the acid number of the resulting biodiesel meets ASTM specifications.

Example 4

Alumina Particles

The alumina particles were purchased from Wuhan Jiangming Import and Export, LLC in China. Table 2 shows the physical characteristics of the porous alumina particles.

TABLE 2

| Description | Testing Methods | Results |
|---|---|---|
| $Al_2O_3$ (%) | NA | >99.5 |
| Weight loss by drying (%) | Q/BKUS 1-2008 | 0.05 |
| Weight loss by sintering (%) | Q/BKUS 1-2008 | 0.95 |
| Particle size (US mesh 60-100) | Q/BKUS 1-2008 | 94 |
| pH value | Q/BKUS 1-2008 | 6.95 |
| Activity | Q/BKUS 1-2008 | Reported |
| Solubility in water | Q/BKUS 1-2008 | 0.20 |
| Specific Density (g/mL) | GB/T 5061-1998 | 1.01 |
| Surface area ($m^2$/g) | BET | 159 |
| $SiO_2$ (%) | GB/T6610.3-2003 | 0.0074 |
| $Na_2O$ (%) | GB/T6610.5-2003 | 0.18 |
| $Fe_2O_3$ (%) | GB/T6610.4-2003 | 0.016 |

Example 5

Formation of a Packed Refinement Reactor 684 g of alumina particles from Example 4 were packed in a 12 inch length by 2 inch i.d. (inside diameter) reactor by dry packing with a shaker machine. The packed particles were washed with deionized water and the eluting water was monitored with a conductivity detector (Omega CDH222, OMEGA Engineering, INC, Stamford, Conn.). The water wash was considered to be complete when the conductivity value of the total dissolved salts (TDS) was measured to be 0.1 or lower. The particles were then washed with approximately 2 column volumes of methanol.

Example 6

Continuous Production of Alkyl Esters from Fatty Acids in Biodiesel Using Dimethyl Carbonate (DMC)

A continuous biodiesel production process (a process flow diagram of the system is shown in FIG. 2) was used for the esterfication of free fatty acids (FFAs) yielding biodiesel having an acid number of 8.52.

Then, a premixed DMC-biodiesel solution consisting of 91.32 g of dimethylcarbonate (DMC) in 1000 g biodiesel (having an initial acid number of 8.52) was prepared, yielding a 1:7 molar ratio of free fatty acids (FFAs) to DMC. The DMC-biodiesel solution was pumped into one ⅛th inch o.d. (outside diameter) stainless steel tube (Alltech Associates, Deerfield, Ill.) using one high pressure Waters 590 HPLC pump obtained from Waters Corporation (Milford, Mass.). The reactant mixture was passed through an electrically driven, custom preheater with the capability of bringing the reactants to the desired set point temperature before entering the independently thermostated fixed bed catalytic reactor (packed as described in Example 5). The custom preheater consisted of wound ⅛ inch o.d. (outside diameter) stainless steel HPLC tubing in a grooved aluminum cylindrical block with an 800 watt Watlow heater in the center of the cylinder. The temperature control of the column was achieved using ten 1 inch length by 2.5 inch i.d. band heaters (Applied Thermal Systems, MN). The hot solution coming out from the reactor was passed through a heat exchanger using water as coolant to bring the hot effluent to room temperature. The backpressure of the system was maintained through the use of a backpressure regulator obtained from Tescom (Elk River, Minn.).

The as-made fuel was collected in a flask and the fuel was distilled under vacuum (120 mbar) at 95° C. to remove the residual DMC and methanol. The total acid number (TAN) was measured for each fraction collected using a Tiamo Titration System (Mettler-Toledo) implementing ASTM D664.

The reaction conditions for samples (ST27-46C through ST27-46J) (N=8) were as follows: preheater temperature (150° C.); reactor inlet temperature (150° C.), reactor middle temperature (154° C.), reactor outlet temperature (150° C.), back pressure (530 PSI), front pressure (550 PSI).

Note that mole ratio of FFAs (free fatty acids) and DMC (dimethyl carbonate) was 1:7; reactor size: 2 inch i.d.×12 inch length; catalyst: alumina (150-250 µm), residence time: 60 minutes.

Figure 4:
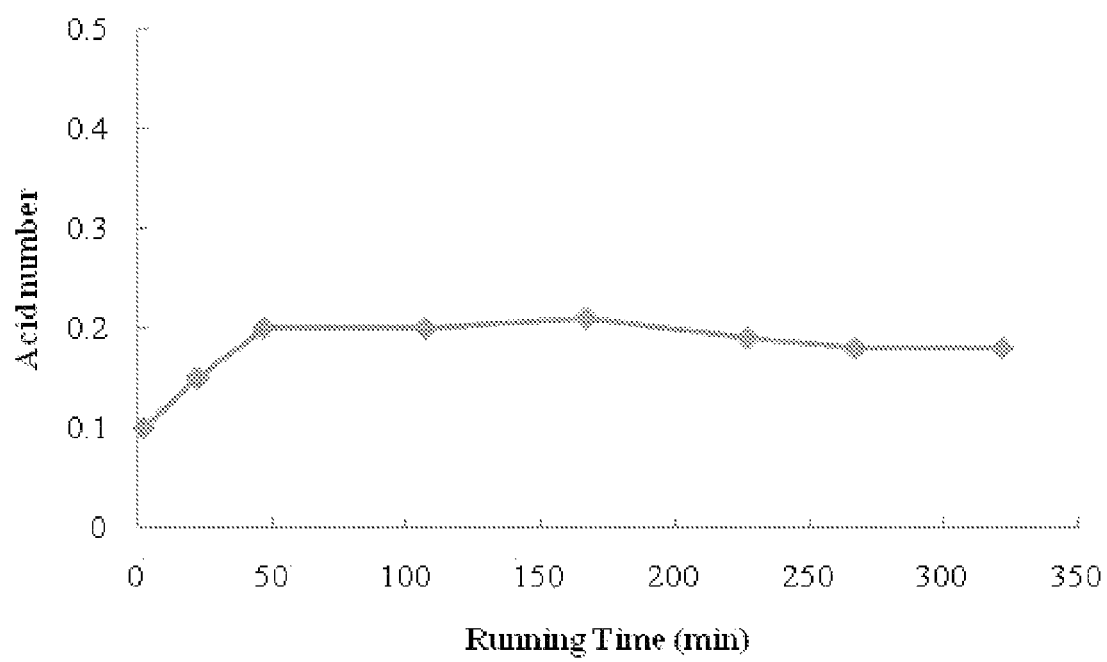
FIG. 4 is a graph of the acid number of biodiesel versus running time for a 1:7 FFA:DMC mixture at 150 degrees Celsius and a 60 minute residence time.

The results are shown in FIG. 4 show that acid number of the as-made biodiesel (acid number 8.52, initially) was decreased to less than 0.5 during 5-hour testing. Thus the esterification of FFAs in biodiesel was achieved successfully and the acid number of the resulting biodiesel meets ASTM specifications (e.g., meets the requirement of <=0.5 mg KOH/g).

Example 7

Continuous Production of Alkyl Esters from Fatty Acids in Biodiesel Using Dimethyl Carbonate (DMC)

Using the system described in Example 5 the continuous esterification of a 1:4.5 molar ratio of FFA:DMC solution, prepared by dissolving 58.71 g of DMC in 1000 g biodiesel (initial acid number 8.52), was investigated at 150° C. The as-made fuel was collected in a flask and the fuel was distilled under vacuum (120 mbar) at 95° C. to remove the residual DMC and methanol. The total acid number (TAN) of each sample was measured as described above.

The reaction conditions for samples (ST27-48A through ST27-48H) (N=8) were as follows: preheater temperature (150° C.); reactor inlet temperature (150° C.), reactor middle temperature (154° C.), reactor outlet temperature (150° C.), back pressure (570 PSI), front pressure (590 PSI).

Note that the reactor size was 2 inch i.d.×12 inch length. The catalyst was alumina (150-250 µm). The residence time was 60 minutes.

Figure 5:
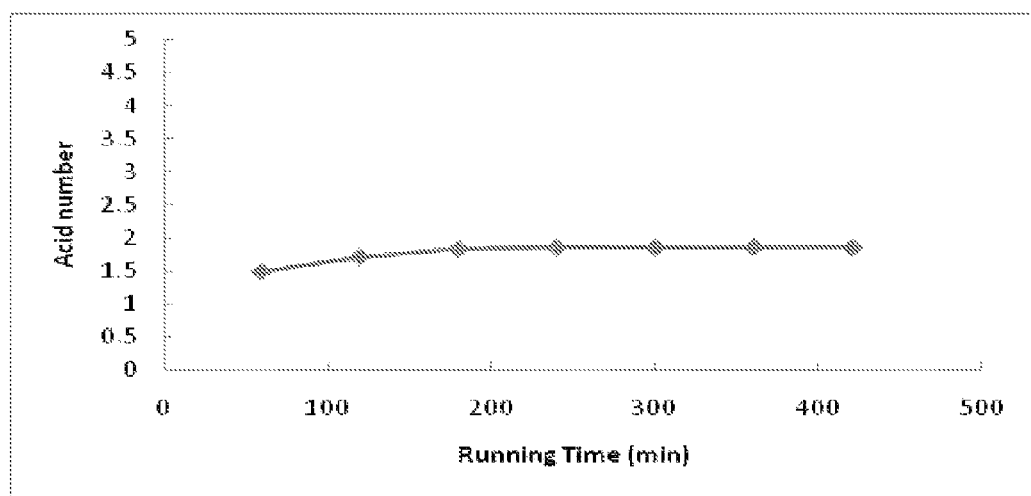
FIG. 5 is a graph of the acid number of biodiesel versus running time for a 1:4.5 FFA:DMC mixture at 150 degrees Celsius and a 60 minute residence time.

The results are shown in FIG. 5. The results show that represent a decrease from 8.52 to an average value of 1.85 during 7-hour testing, indicating that approximately 80% of the FFAs in the biodiesel have been removed.

Example 8

Residence Time Effect on Continuous Production of Alkyl Esters from Fatty Acids in Biodiesel Using Dimethyl Carbonate (DMC)

Using the system described in Example 5 the continuous esterification of a 4.5:1 molar ratio of DMC:FFA solution, prepared by dissolving 58.71 g of DMC in 1000 g biodiesel (initial acid number 8.52), was investigated at 180° C. The as-made fuel was collected in a flask and the fuel was distilled under vacuum (120 mbar) at 95° C. to remove the residual DMC and methanol. The TAN of each sample was measured.

The reaction conditions are summarized for samples (ST27-50A through ST27-50H) (N=8) as follows: preheater temperature (180° C.); reactor inlet temperature (180° C.), reactor middle temperature (186° C.), reactor outlet temperature (180° C.), back pressure (570 PSI), front pressure (590 PSI). For samples (ST27-52A through ST27-52H) (N=8) the conditions were as follows: preheater temperature (180° C.); reactor inlet temperature (180° C.), reactor middle temperature (184° C.), reactor outlet temperature (180° C.), back pressure (570 PSI), front pressure (590 PSI). For samples (ST27-54A through ST27-54H) (N=8) the conditions were as follows: preheater temperature (180° C.); reactor inlet temperature (180° C.), reactor middle temperature (180° C.), reactor outlet temperature (180° C.), back pressure (570 PSI), front pressure (590 PSI). The mole ratio of FFAs and DMC was 1:4.5; reactor size: 2 inch i.d.×12 inch length; catalyst: alumina (150-250 µm).

A significant difference between the experimental groups was the residence time (60 minutes for ST27-50A-H, 120 min for 52A-H, 45 min for 54A-H).

Figure 6:
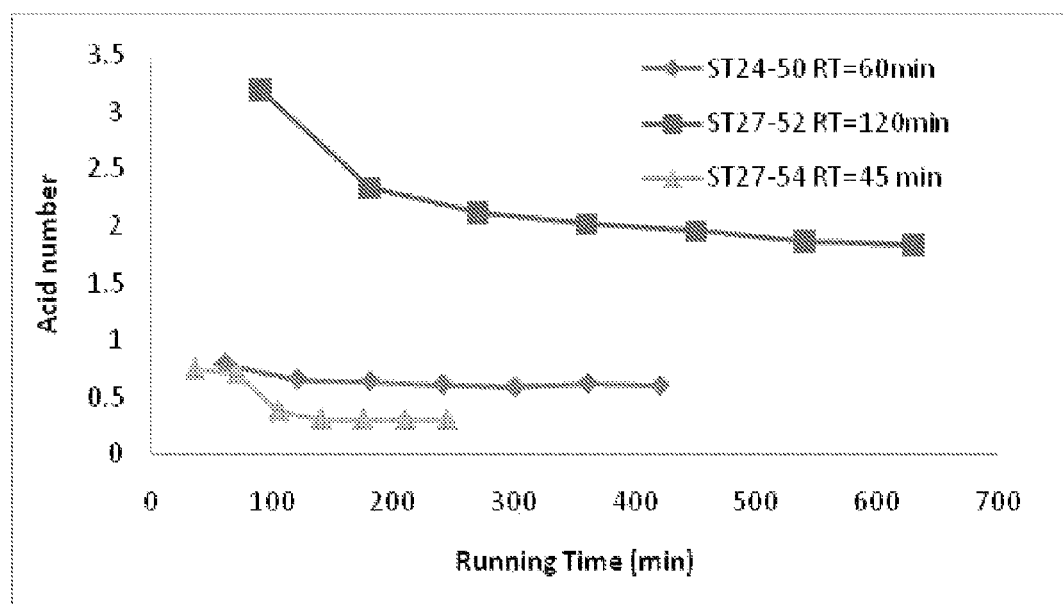
FIG. 6 is a graph of the acid number of biodiesel versus running time for a 1:4.5 FFA:DMC mixture at 180 degrees Celsius and residence times of 45 minutes, 60 minutes, or 120 minutes.

The results are shown in FIG. 6. The acid numbers shown in FIG. 6 demonstrate large changes based on residence time at constant molar ratios of DMC:FFA. Specifically, as can be seen from the FIG. 6, the acid number actually increases as contact time (or residence time) increases.

Example 9

Continuous Production of Alkyl Esters from Fatty Acids in Biodiesel Using Dimethyl Carbonate (DMC)

Using the system described in Example 5 the continuous esterification of a 2:1 molar ratio of DMC:FFA solution, prepared by dissolving 26.09 g of DMC in 1000 g biodiesel (initial acid number 8.52), was investigated at 150° C. The reactor size was 2 inch i.d.×12 inch. The catalyst was alumina (150-250 µm). The residence time was 60 minutes. For samples (ST27-47A through ST27-47H) (N=8) the conditions were as follows: preheater temperature (150° C.); reactor inlet temperature (150° C.), reactor middle temperature (154° C.), reactor outlet temperature (150° C.), back pressure (570 PSI), front pressure (590 PSI).

Aspects of the sampling are summarized in Table 3. The as-made fuel was collected in a flask and the fuel was distilled under vacuum (120 mbar) at 95° C. to remove the residual DMC and methanol.

TABLE 3

| Sample Name | Sampling Time (min) | Total Time (min) |
|---|---|---|
| ST27-47A | 60 | 60 |
| ST27-47B | 60 | 120 |
| ST27-47C | 60 | 180 |
| ST27-47D | 60 | 240 |
| ST27-47E | 60 | 300 |
| ST27-47F | 60 | 360 |
| ST27-47G | 60 | 420 |
| ST27-47H | 60 | 480 |

Figure 7:
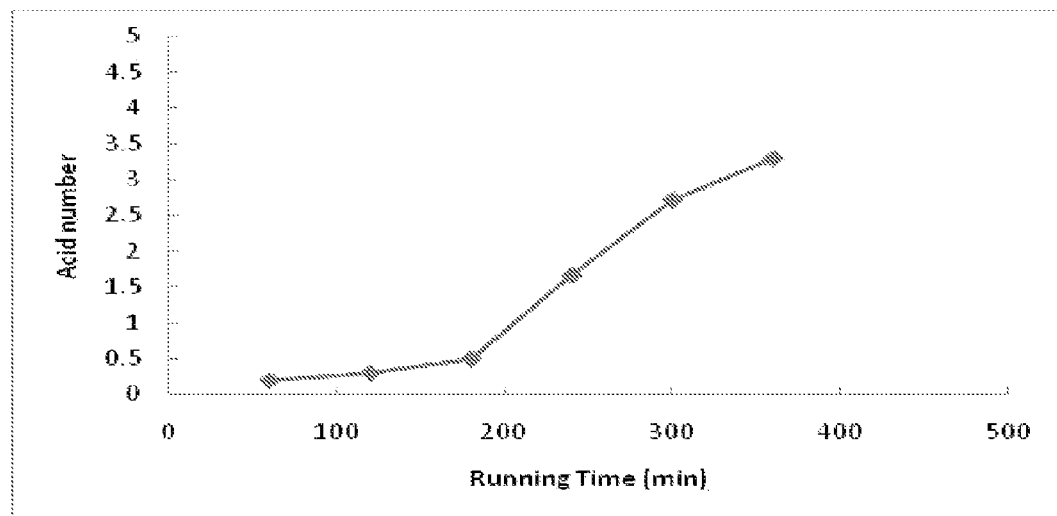
FIG. 7 is a graph of the acid number of biodiesel versus running time for a 1:2 FFA:DMC mixture at 150 degrees Celsius and a 60 minute residence time.

The TAN of each sample was measured. The results are shown in FIG. 7. The acid numbers shown in FIG. 7 display a gradual increase during 6-hour testing.

Example 10

Molar Ratio Effect on Continuous Production of Alkyl Esters from Fatty Acids in Biodiesel Using Dimethyl Carbonate (DMC)

Using the system described in Example 5 the continuous esterification of a 4.5:1 molar ratio of DMC:FFA solution, prepared by dissolving 58.71 g of DMC in 1000 g biodiesel (initial acid number 8.52), and then a 3:1 molar ratio of DMC:FFA solution, prepared by dissolving 31.46 g of DMC in 1000 g biodiesel (initial acid number of 8.52) were investigated at 180° C. The reactor size was 2 inches i.d.×12 inches in length. The catalyst was alumina (150-250 µm). The residence time was 45 minutes. The as-made fuel was collected in a flask and the fuel was distilled under vacuum (120 mbar) at 95° C. to remove the residual DMC and methanol. The TAN of each sample was measured.

The reaction conditions are summarized as follows: for samples (ST27-55A through ST27-55H) (N=8) preheater temperature (180° C.); reactor inlet temperature (180° C.), reactor middle temperature (186° C.), reactor outlet temperature (180° C.), back pressure (530 PSI), front pressure (550 PSI). For samples (ST27-57A through ST27-57L) (N=8) were as follows: preheater temperature (180° C.); reactor inlet temperature (180° C.), reactor middle temperature (184° C.), reactor outlet temperature (180° C.), back pressure (570 PSI), front pressure (590 PSI).

Figure 8:
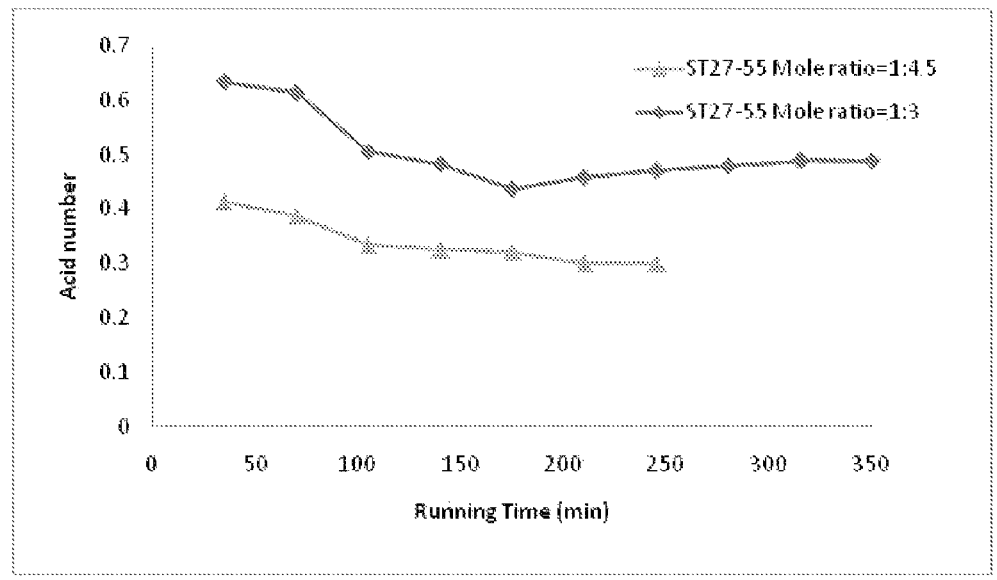
FIG. 8 is a graph of the acid number of biodiesel versus running time for 1:3 or 1:4.5 FFA:DMC mixtures at 180 degrees Celsius and a 45 minute residence time.

The results are shown in FIG. 8. The acid numbers shown in FIG. 8 demonstrate that biodiesel meeting the ASTM specification for TAN can be made at 180° C. and molar ratios 1:3 or 1:4.5 FFA:DMC. However, the molar ratio of 1:4.5 FFA:DMC was somewhat more effective at reducing the acid number.

Example 11

Molar Ratio Effect on Continuous Production of Alkyl Esters from Fatty Acids in Biodiesel Using Dimethyl Carbonate (DMC)

Using the system described in Example 5 the effect of the molar ratio of DMC:FFA on the acid number during continuous esterification was investigated at 180° C. Solutions of 10:1 (89.66 g DMC), 5:1 (47.96 g DCM), 4:1 (46.11 g DMC), 3:1 (27.60 g DMC), and 1:1 (8.97 g DMC) molar ratio of DMC:FFA were prepared by dissolving the appropriate amount of DMC in 1000 g biodiesel (initial acid number 6.02). The reactor size was 2 inch i.d.×12 inch. The catalyst was alumina (150-250 µm). The residence time was 45 minutes. The as-made fuel was collected in a flask and the fuel was distilled under vacuum (120 mbar) at 95° C. to remove the residual DMC and methanol. The TAN of each sample was measured.

The reaction conditions are summarized as follows: for samples ST27-59A through ST27-59J; ST27-60A through ST27-60J; ST27-62A through ST27-62J; ST27-68A through ST27-68J; and ST27-69A through ST27-69J: preheater temperature (180° C.); reactor inlet temperature (180° C.), reactor middle temperature (179° C.), reactor outlet temperature (180° C.), back pressure (530 PSI), front pressure (550 PSI). Molar ratios of FFAs to DMC for the experimental groups were as shown in Table 4.

TABLE 4

| Experimental Group | Mole Ratio (FFA:DMC) |
|---|---|
| ST27-59(A-J) | 1:3 |
| ST27-60(A-J) | 1:4 |
| ST27-62(A-J) | 1:5 |
| ST27-68(A-J) | 1:10 |
| ST27-69(A-J) | 1:1 |

Figure 9:
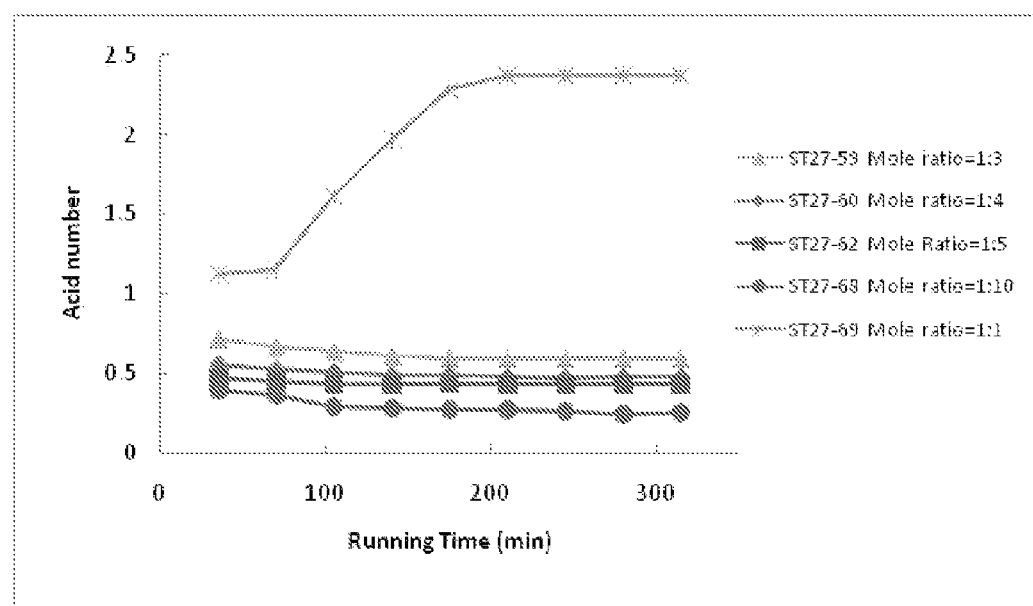
FIG. 9 is a graph of the acid number of biodiesel versus running time for 1:1, 1:3, 1:4, 1:5, or 1:10 FFA:DMC mixtures at 180 degrees Celsius and a 45 minute residence time.

The results are shown in FIG. 9. Acid numbers shown in FIG. 9 indicate that the molar ratio of FFA:DMC has a significant effect on the final acid number with ratios of higher amounts of DMC yielding lower acid numbers.

Example 12

Temperature Effect on Continuous Production of Alkyl Esters from Fatty Acids in Biodiesel Using Dimethyl Carbonate (DMC) at a FFA:DMC Molar Ratio of 1:5

Using the system described in Example 5 the continuous esterification of a 5:1 molar ratio of DMC:FFA solution, prepared by dissolving 58.71 g of DMC in 1000 g biodiesel (initial acid number 6.02), was investigated at 170, 175, 180, 185 and 190° C. The reactor size was 2 inches i.d.×12 inches. The catalyst was alumina (150-250 µm). The residence time was 45 minutes. The as-made fuel was collected in a flask and the fuel was distilled under vacuum (120 mbar) at 95° C. to remove the residual DMC and methanol. The TAN of each sample was measured.

The reaction conditions for samples (ST27-62A through ST27-62J) were as follows: preheater temperature (180° C.); reactor inlet temperature (180° C.), reactor middle temperature (179° C.), reactor outlet temperature (180° C.), back pressure (530 PSI), front pressure (550 PSI).

The reaction conditions for samples (ST27-64A through ST27-64I) (N=8) were as follows: preheater temperature (190° C.); reactor inlet temperature (190° C.), reactor middle temperature (191° C.), reactor outlet temperature (190° C.), back pressure (530 PSI), front pressure (550 PSI).

The reaction conditions for samples (ST27-71A through ST27-71J) (N=8) were as follows: preheater temperature (185° C.); reactor inlet temperature (185° C.), reactor middle temperature (186° C.), reactor outlet temperature (185° C.), back pressure (530 PSI), front pressure (550 PSI).

The reaction conditions for samples (ST27-72A through ST27-72J) (N=8) were as follows: preheater temperature (175° C.); reactor inlet temperature (175° C.), reactor middle temperature (176° C.), reactor outlet temperature (175° C.), back pressure (530 PSI), front pressure (550 PSI).

The reaction conditions for samples (ST27-73A through ST27-73J) (N=8) were as follows: preheater temperature (170° C.); reactor inlet temperature (170° C.), reactor middle temperature (171° C.), reactor outlet temperature (170° C.), back pressure (530 PSI), front pressure (550 PSI).

Figure 10:
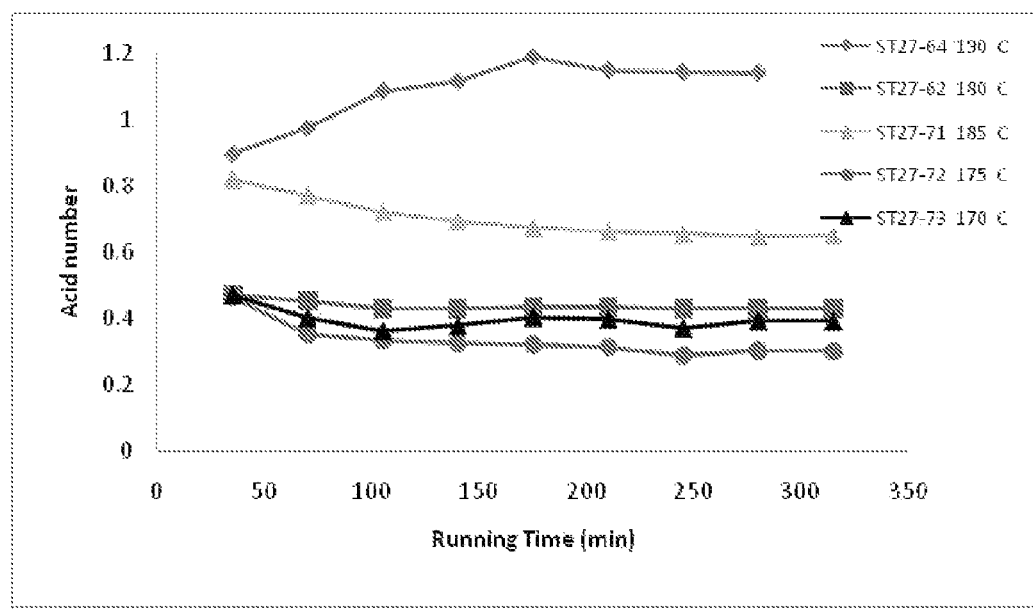
FIG. 10 is a graph of the acid number of biodiesel versus running time for 1:5 FFA:DMC mixtures at 170, 175, 180, 185, or 190 degrees Celsius and a 45 minute residence time.

The results are shown in FIG. 10. The acid numbers in FIG. 10 show the temperature effect of reducing the acid number. It was observed that biodiesel meeting ASTM specifications was produced in a temperature range of 170° C. to 180° C.

Example 13

Continuous Production of Alkyl Esters from Fatty Acids in Biodiesel Using a Mixture of Methanol and Dimethyl Carbonate (DMC)

Using the system described in Example 5 the continuous esterification of a 1:1:18.5 molar ratio of FFA:DMC:MeOH solution, prepared by dissolving 9.5 g of DMC and 63 g MeOH in 1000 g biodiesel (initial acid number 6.02), was investigated at 150° C. The as-made fuel was collected in a flask and the fuel was distilled under vacuum (120 mbar) at 95° C. to remove the residual DMC and methanol. The TAN of each sample was measured.

The reaction conditions for samples (ST27-59A through ST27-59F) (N=8) were as follows: preheater temperature (150° C.); reactor inlet temperature (150° C.), reactor middle temperature (178° C.), reactor outlet temperature (150° C.), back pressure (520 PSI), front pressure (550 PSI).

Note that mole ratio of FFAs:DMC:MeOH is 1:1:18.5, reactor size: 2 inch i.d.×12 inch; catalyst: alumina (150-250 μm), residence time: 60 minutes.

Figure 11:
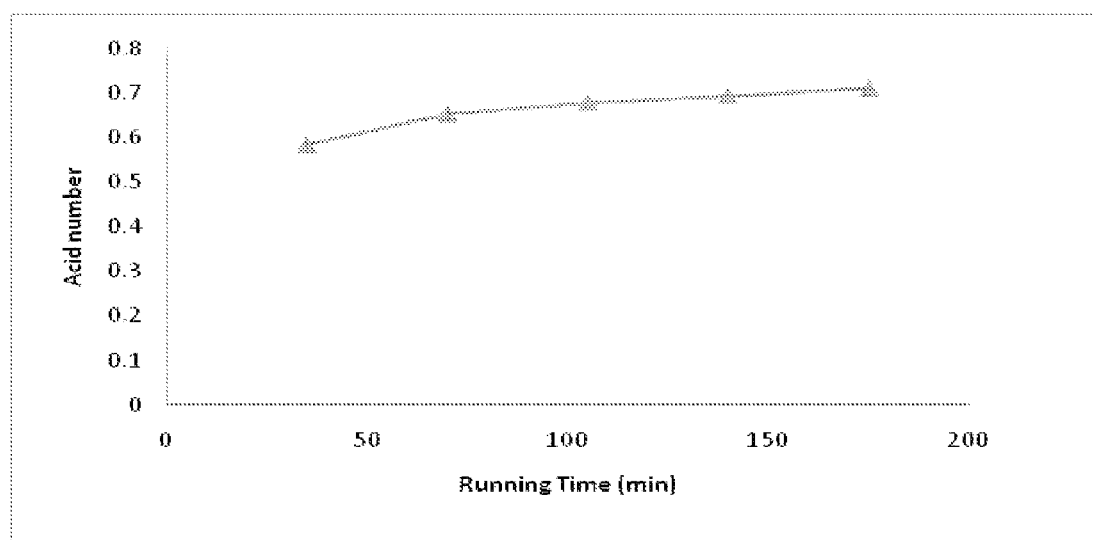
FIG. 11 is a graph of the acid number of biodiesel versus running time for 1:1:18.5 FFAs:DMC:MeOH mixture at 150 degrees Celsius and a 60 minute residence time.

The results are shown in FIG. 11. FIG. 11 shows that acid numbers obtained during a 4-hour testing. The acid number is decreased from 6.02 to an average of 0.65.

Example 14

Continuous Production of Alkyl Esters from Fatty Acids in As-Made Biodiesel Using Dimethyl Carbonate (DMC)

Using the system described in Example 5 the continuous esterification of as-made biodiesel (initial TAN=5.01, water=0.48% by Karl Fischer, methanol=9.7%) was investigated. Solutions of 1:5 and 1:7 FFA:DMC were prepared by dissolving either 39.7 g of DMC (5:1) or 55.6 g of DMC in 1000 g as-made biodiesel. The esterification reactions were investigated at 170 and 180° C. The reactor size was 2 inches i.d.×12 inches. The catalyst was alumina (150-250 μm). The residence time was 45 minutes. The as-made fuel was collected in a flask and the fuel was distilled under vacuum (120 mbar) at 95° C. to remove the residual DMC and methanol. The TAN of each sample was measured.

The reaction conditions for samples (ST27-65A through ST27-65J) (N=8) were as follows: preheater temperature (180° C.); reactor inlet temperature (180° C.), reactor middle temperature (180° C.), reactor outlet temperature (180° C.), back pressure (530 PSI), front pressure (550 PSI); and mole ratio of 1:5 FFA:DMC.

The reaction conditions for samples (ST27-68A through ST27-68J) (N=8) were as follows: preheater temperature (170° C.); reactor inlet temperature (170° C.), reactor middle temperature (170° C.), reactor outlet temperature (170° C.), back pressure (530 PSI), front pressure (550 PSI); and mole ratio of 1:5 FFA:DMC.

The reaction conditions for samples (ST27-67A through ST27-67J) (N=8) were as follows: preheater temperature (180° C.); reactor inlet temperature (180° C.), reactor middle temperature (180° C.), reactor outlet temperature (180° C.), back pressure (530 PSI), front pressure (550 PSI); and mole ratio of 1:7 FFA:DMC.

Figure 12:
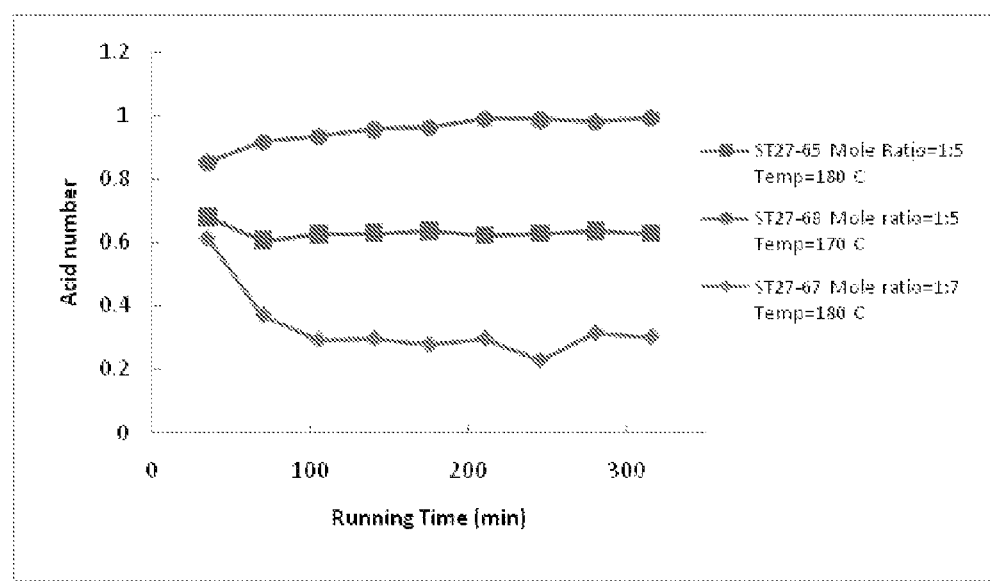
FIG. 12 is a graph of the acid number of biodiesel versus running time for 1:5 or 1:7 FFA:DMC mixtures at 170 or 180 degrees Celsius and a 45 minute residence time.

The results are shown in FIG. 12. FIG. 12 shows the acid numbers measured during 7-hours of testing.

Example 15

Temperature Effect on Continuous Production of Alkyl Esters from Fatty Acids in Biodiesel Using Dimethyl Carbonate (DMC) at a 1:4 Molar Ratio of FFA:DMC Using the system described in Example 5 the continuous esterification of a 1:4 molar ratio of FFA:DMC solution, prepared by dissolving 33.33 g of DMC in 1000 g biodiesel (initial acid number 5.44), was investigated at 170, 175 and 180° C. The as-made fuel was collected in a flask and the fuel was distilled under vacuum (120 mbar) at 95° C. to remove the residual DMC and methanol. The TAN of each sample was measured.

The reaction conditions for samples (ST27-74A through ST27-74J) (N=8) were as follows: preheater temperature (175° C.); reactor inlet temperature (175° C.), reactor middle temperature (176° C.), reactor outlet temperature (175° C.), back pressure (530 PSI), front pressure (550 PSI); and mole ratio of 1:4 FFA:DMC.

The reaction conditions for samples (ST27-76A through ST27-76J) (N=8) were as follows: preheater temperature (180° C.); reactor inlet temperature (180° C.), reactor middle temperature (181° C.), reactor outlet temperature (180° C.), back pressure (530 PSI), front pressure (550 PSI); and mole ratio of 1:4 FFA:DMC.

The reaction conditions for samples (ST27-77A through ST27-77J) (N=8) were as follows: preheater temperature (170° C.); reactor inlet temperature (170° C.), reactor middle temperature (171° C.), reactor outlet temperature (170° C.), back pressure (530 PSI), front pressure (550 PSI); and mole ratio of 1:4 FFA:DMC.

Figure 13:
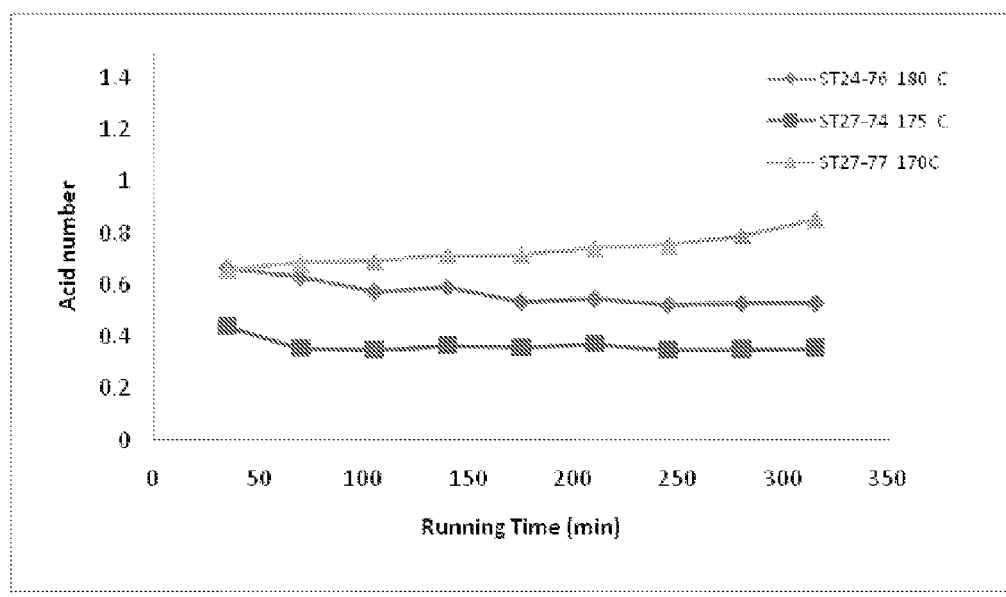
FIG. 13 is a graph of the acid number of biodiesel versus running time for 1:4 FFA:DMC mixtures at 170, 175, or 180 degrees Celsius and a 45 minute residence time.

The results are shown in FIG. 13. FIG. 13 shows the effect on temperature on the esterification of free fatty acids in biodiesel using a 1:4 FFA:DMC molar ratio. FIG. 13 shows that 175 degrees Celsius was more effective than either 180 degrees Celsius or 170 degrees Celsius for reducing acid number.

Example 16

Continuous Production of Alkyl Esters from Fatty Acids in Biodiesel without Alumina (Blank Study)

The continuous esterification of a 1:5 molar ratio of FFA: DMC solution, prepared by dissolving 66.20 g of DMC in 1000 g biodiesel (initial acid number 8.64), was investigated at 175° C. The experimental setup used was the same setup as described in Example 5 with the notable exception that the column was devoid of alumina particles, an empty column. The as-made fuel was collected in a flask and the fuel was distilled under vacuum (120 mbar) at 95° C. to remove the residual DMC and methanol. The TAN of each sample was measured.

The reaction conditions for samples (ST27-78A through ST27-78J) (N=8) were as follows: preheater temperature (175° C.); reactor inlet temperature (175° C.), reactor middle temperature (176° C.), reactor outlet temperature (175° C.), back pressure (530 PSI), front pressure (550 PSI); and mole ratio of 1:5 FFA:DMC.

Figure 14:
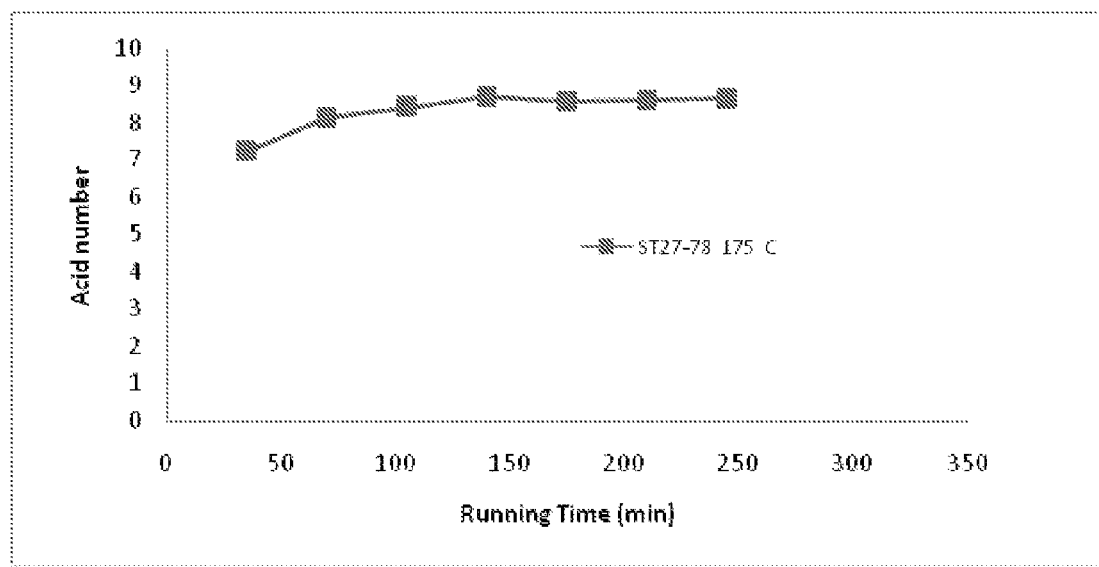
FIG. 14 is a graph of the acid number of biodiesel versus running time for 1:5 FFA:DMC mixtures at 175 degrees Celsius and a 45 minute residence time.

The results are shown in FIG. 14. The acid numbers shown in FIG. 14 are very close to the original acid number of the biodiesel composition. As such, this example shows that a catalyst, such as alumina, plays an important role in reducing acid number.

Example 17

Continuous Production of Alkyl Esters from Fatty Acids in Biodiesel by Using Dimethyl Carbonate under Different Pressure (730 psi).

Using the system described in Example 5 the continuous esterification of a 1:5 molar ratio of FFA:DMC solution, prepared by dissolving 66.20 g of DMC in 1000 g biodiesel (initial acid number 8.64), was investigated at 185° C. and a back pressure of ~700 psi and 45 minutes residence time. The as-made fuel was collected in a flask and the fuel was distilled under vacuum (120 mbar) at 95° C. to remove the residual DMC and methanol. The TAN of each sample was measured.

Figure 15:
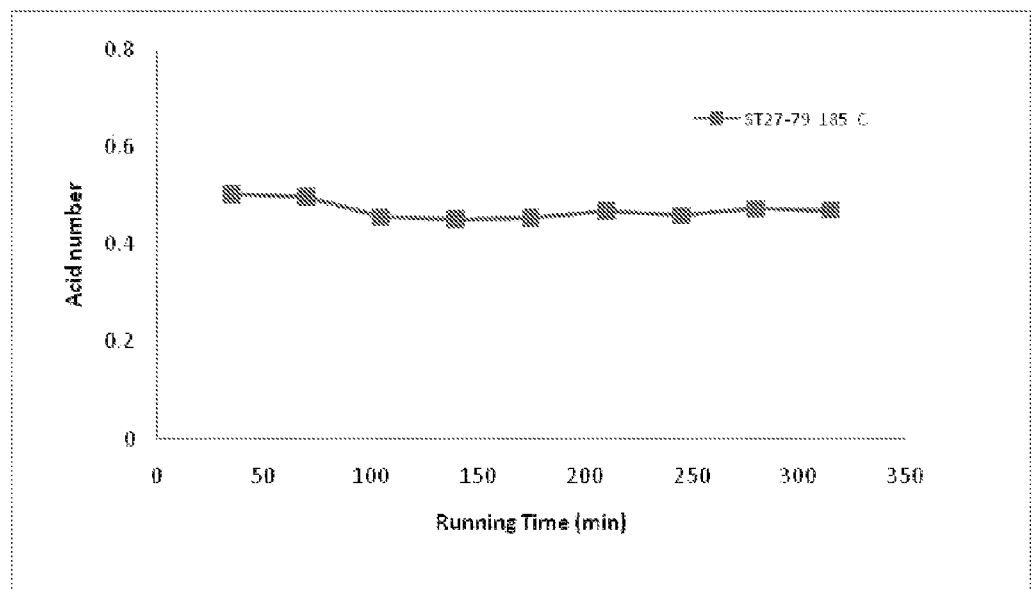
FIG. 15 is a graph of the acid number of biodiesel versus running time for 1:5 FFA:DMC mixtures at 185 degrees Celsius and a 45 minute residence time at an elevated pressure of 750 PSI.

The reaction conditions for samples (ST27-79A through ST27-79J) (N=8) were as follows: preheater temperature (185° C.); reactor inlet temperature (185° C.), reactor middle temperature (186° C.), reactor outlet temperature (185° C.), back pressure (730 PSI), front pressure (750 PSI); and mole ratio of 1:5 FFA:DMC. The results are shown in FIG. 15.

Example 18

Continuous Production of Alkyl Esters from Fatty Acids in Biodiesel Using Methanol Using the system described in Example 5 the continuous esterification of a 1:32 molar ratio of FFA:MeOH solution, prepared by dissolving 150.50 g of methanol in 1000 g biodiesel (initial acid number 8.64), was investigated at 150° C. and a back pressure of ~700 psi, and 45 minutes residence time. The as-made fuel was collected in a flask and the fuel was distilled under vacuum (120 mbar) at 95° C. to remove the residual methanol. The TAN of each sample was measured.

The reaction conditions for samples (ST27-82A through ST27-82J) (N=8) were as follows: preheater temperature (150° C.); reactor inlet temperature (150° C.), reactor middle temperature (151° C.), reactor outlet temperature (150° C.), back pressure (730 PSI), front pressure (750 PSI).

Figure 16:
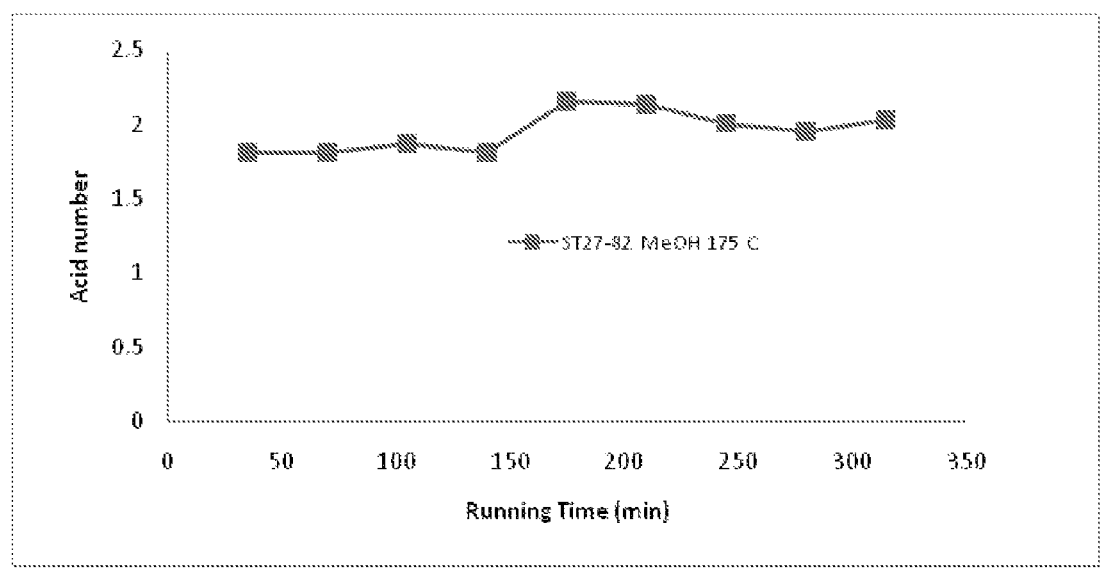
FIG. 16 is a graph of the acid number of biodiesel versus running time for 1:32 FFA:MeOH mixtures at 150 degrees Celsius and a 45 minute residence time at an elevated pressure of 750 PSI.

The results are shown in FIG. 16. This example shows that methanol, by itself, did not lower acid numbers as much as DMC.

Example 19

Continuous Production of Alkyl Esters from Fatty Acids in Biodiesel Using Dimethyl Carbonate and Titania as a Catalyst Using the system described in Example 5 the continuous esterification of a 1:5 molar ratio of FFA:DMC solution, prepared by dissolving 150.50 g of methanol in 1000 g biodiesel (initial acid number 8.64), was investigated at 175° C. and a back pressure of ~500 psi and a residence time of 45 minutes. Titania (80 µm average size/60 Å average pore diameter) was used as a catalyst instead of alumina catalyst from Examples 6-18. The as-made fuel was collected in a flask and the fuel was distilled under vacuum (120 mbar) at 95° C. to remove the residual DMC and methanol. The TAN of each sample was measured.

The reaction conditions for samples (ST27-81A through ST27-81J) (N=8) were as follows: preheater temperature (175° C.); reactor inlet temperature (175° C.), reactor middle temperature (181° C.), reactor outlet temperature (173° C.), back pressure (500 PSI), front pressure (580 PSI); and mole ratio of 1:5 FFA:DMC.

Figure 17:
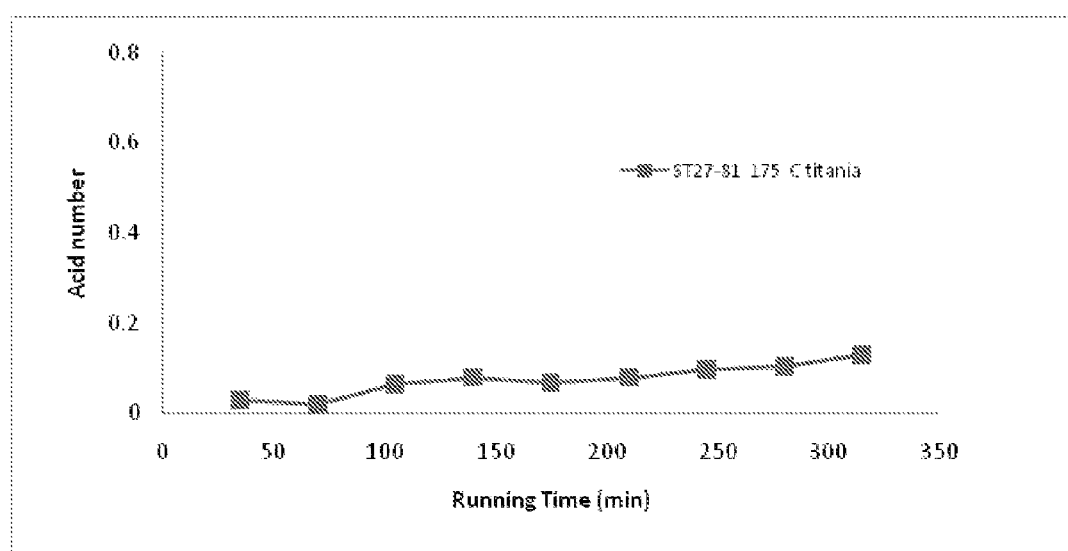
FIG. 17 is a graph of the acid number of biodiesel versus running time for 1:5 FFA:DMC mixtures at 175 degrees Celsius and a 45 minute residence time at a pressure of 500 PSI using titania particles.

The results are shown in FIG. 17. This example shows that titania can be used as a catalyst to reduce the acid number of biodiesel in conjunction with the addition of DMC.

Example 20

Continuous Production of Biofuel using Bio-Oil (Pyrolysis Oil) and Dimethyl Carbonate A: Preparation of Bio-Oil Solution A fraction of bio-oil was obtained having a tar-like viscosity and an acid number of 43. 1.327 kg of this bio-oil fraction was put into a beaker, along with 663.88 g methanol and 663.74 g DMC. The mixture was centrifuged. About 42% of the bio-oil fraction was dissolved in the methanol-DMC solution. The centrifuged solution was then diluted with 1326.9 g mixture of a 50/50 MeOH/DMC solution. The diluted solution was then centrifuged again.

75.18 g of the diluted solution was put into a beaker and 751.80 g of a mixture of 50/50 MeOH/DMC solution was added to form a 10% bio-oil in Methanol-DMC solution.

B Upgrading of Bio-Oil Solution

One high pressure Waters 590 HPLC pump obtained from Waters Corporation (Milford, Mass.) was used to draw the DMC-methanol-bio-oil solution formed above. The solution was pumped into one ⅛th inch o.d. stainless steel tube (Altech Associates, Deerfield, Ill.). The reactant passed through an electrically driven preheater that was capable of bringing the reactants to the desired set point temperature before entering the independently thermostated fixed bed catalytic reactor (2 inches i.d.×12 inches length) filled with 684 g of alumina as a catalyst (150-250 um).

The temperature control was achieved using some EZ-Zone PM Watlow (St. Louis, Mo.) temperature controllers. The custom preheater was used to bring the temperature of the flowing fluid up to the desired temperature before it entered the reactor which consisted of wound stainless steel HPLC tubing in a grooved aluminum cylindrical block with an 800 watt Watlow heater in the center of the cylinder. The flow rate was set for a residence time of 80 minutes. The hot solution coming out from the reactor was passing through a heater exchanger using water as coolant to cool the hot fluent to room temperature. Then the backpressure of the system was maintained through the use of a backpressure regulator obtained from Tescom (Elk River, Minn.).

The reaction conditions for samples (ST27-87A-D&S) (N=5) were as follows: preheater temperature (120° C.); reactor inlet temperature (118° C.), reactor middle temperature (120° C.), reactor outlet temperature (118° C.), back pressure (530 PSI), front pressure (600 PSI).

Figure 18:
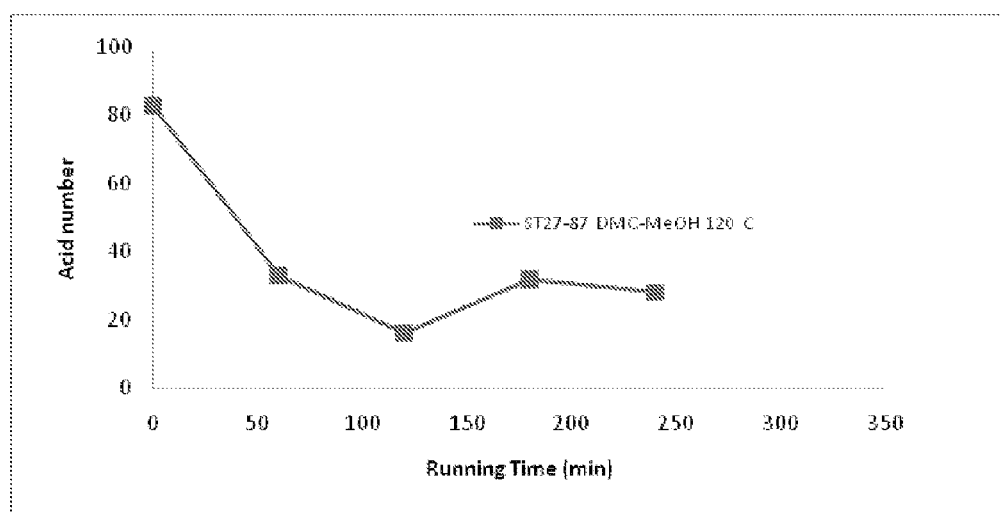
FIG. 18 is a graph of the acid number of a bio-oil fraction versus running time at 120 degrees Celsius and an 80 minute residence time at a pressure of 500 PSI.

The as-made fuel was collected in a flask. The fuel was distilled under vacuum (120 mbar) to remove the residual DMC and methanol. The results are shown in FIG. 18. The results show that bio-oil was successfully upgraded. Specifically, acid number was significantly decreased. Further, the viscosity was observed to decrease significantly.

Example 21

Biodiesel Color Indication

A color indicator in a biodiesel product was found in the following testing. A series of tests were performed using different compounds such as acidic compounds (e.g. stearic acid and acetic acid), and basic compound (e.g pyridine). The colors of biodiesel solutions were found to change from yellow to red as acidic compounds were added into the neutral solution. The red changed back from red to yellow when the basic compound was added. It is believed that this special indicator property can be used as a fingerprint to identify biodiesel made using processes such as those described herein. The isolated natural indicator compound could be used as food color indicator, high temperature color indicator material, or the like.

The invention has been described with reference to various specific and preferred embodiments and techniques. However, it should be understood that many variations and modifications may be made while remaining within the spirit and scope of the invention.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

All publications and patent applications in this specification are indicative of the level of ordinary skill in the art to which this invention pertains. All publications and patent applications are herein incorporated by reference to the same extent as if each individual publication or patent application was specifically and individually indicated by reference.

The invention claimed is:

1. A method of producing a refined fatty acid alkyl ester composition comprising:
   contacting a lipid feedstock and an alcohol with a first metal oxide catalyst at a temperature of greater than 200 degrees Celsius and a pressure of greater than 500 psi to form an unrefined fatty acid alkyl ester composition including free fatty acids;
   combining the unrefined fatty acid alkyl ester composition including free fatty acids with dimethyl carbonate to form a refining mixture; and
   contacting the refining mixture with a second metal oxide catalyst at a temperature of greater than 100 degrees Celsius to form a refined fatty acid alkyl ester composition.

2. The method of claim 1, the first metal oxide catalyst selected from the group consisting of zirconia, titania, alumina, and *hafnia*.

3. The method of claim 1, the second metal oxide catalyst selected from the group consisting of zirconia, titania, alumina, and *hafnia*.

4. The method of claim 1, wherein the amount of dimethyl carbonate (DMC) is in a molar ratio with the free fatty acid greater than or equal to 1:1 free fatty acid:DMC.

5. The method of claim 1, wherein the amount of dimethyl carbonate (DMC) is in a molar ratio with the free fatty acid greater than or equal to 1:3 free fatty acid:DMC.

6. The method of claim 1, the lipid feedstock having an acid number of greater than about 0.5 mg KOH/g oil.

7. The method of claim 1, wherein contacting the refining mixture with the second metal oxide catalyst is performed with a residence time of less than or equal to 120 minutes.

8. The method of claim 1, wherein contacting the refining mixture with the second metal oxide catalyst is performed with a residence time of less than or equal to 60 minutes.

9. The method of claim 1, wherein contacting the refining mixture with the second metal oxide catalyst is performed at a temperature between about 150 degrees Celsius and 220 degrees Celsius.

10. The method of claim 1, wherein contacting the refining mixture with the second metal oxide catalyst is performed at a temperature between about 170 degrees Celsius and 180 degrees Celsius.

11. The method of claim 1, wherein contacting the refining mixture with the second metal oxide catalyst is performed at a pressure of greater than or equal to 500 PSI.

12. The method of claim 1, the refined fatty acid alkyl ester composition having an acid number of less than about 0.5 mg KOH/g oil.

13. A method of refining an alkyl ester composition comprising:
   combining an alkyl ester composition having an acid number of greater than 0.5 mg KOH/g oil with dimethyl carbonate to form a refining mixture; and
   contacting the refining mixture with a metal oxide catalyst at a temperature of greater than about 100 degrees Celsius to form a refined alkyl ester composition having an acid number less than or equal to 0.5 mg KOH/g oil.

14. The method of claim 13, the metal oxide catalyst selected from the group consisting of zirconia, titania, alumina, and *hafnia*.

15. The method of claim 13, wherein the amount of dimethyl carbonate (DMC) is in a molar ratio with the free fatty acid greater than or equal to 1:1 free fatty acid:DMC.

16. The method of claim 13, wherein the amount of dimethyl carbonate (DMC) is in a molar ratio with the free fatty acid greater than or equal to 1:3 free fatty acid:DMC.

17. The method of claim 13, wherein contacting the refining mixture with the metal oxide catalyst is performed with a residence time of less than or equal to 120 minutes.

18. The method of claim 13, wherein contacting the refining mixture with the metal oxide catalyst is performed with a residence time of less than or equal to 60 minutes.

19. The method of claim 13, wherein contacting the refining mixture with the metal oxide catalyst is performed at a temperature between about 150 degrees Celsius and 220 degrees Celsius.

20. The method of claim 13, wherein contacting the refining mixture with the metal oxide catalyst is performed at a temperature between about 170 degrees Celsius and 180 degrees Celsius.

* * * * *